US011689398B2

(12) United States Patent
Sakhnini et al.

(10) Patent No.: US 11,689,398 B2
(45) Date of Patent: Jun. 27, 2023

(54) SCRAMBLING INITIALIZATION INDICATION FOR HIGHER BANDS

(71) Applicant: QUALCOMM Incorporated, San Diego, CA (US)

(72) Inventors: Iyab Issam Sakhnini, San Diego, CA (US); Tao Luo, San Diego, CA (US); Jun Ma, San Diego, CA (US); Jing Sun, San Diego, CA (US); Xiaoxia Zhang, San Diego, CA (US); Hemant Saggar, Irvine, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/484,529

(22) Filed: Sep. 24, 2021

(65) Prior Publication Data

US 2023/0101584 A1 Mar. 30, 2023

(51) Int. Cl.
*H04L 27/01* (2006.01)
*H04L 27/00* (2006.01)
*H04W 56/00* (2009.01)

(52) U.S. Cl.
CPC ....... *H04L 27/001* (2013.01); *H04W 56/0015* (2013.01)

(58) Field of Classification Search
CPC ............. H04L 25/0228; H04L 25/0232; H04L 27/001; H04L 5/0048; H04W 56/001; H04W 56/0015
USPC ........................................................ 370/350
See application file for complete search history.

(56) References Cited

U.S. PATENT DOCUMENTS

| 2019/0021062 | A1* | 1/2019 | Abedini | H04W 72/046 |
| 2020/0099500 | A1* | 3/2020 | Huang | H04L 5/0051 |
| 2021/0105839 | A1* | 4/2021 | Reial | H04W 16/28 |
| 2021/0176687 | A1* | 6/2021 | Ko | H04L 5/005 |
| 2021/0345261 | A1* | 11/2021 | Baldemair | H04L 5/14 |
| 2022/0200824 | A1* | 6/2022 | Sakhnini | H04W 56/001 |

* cited by examiner

*Primary Examiner* — Robert J Lopata
(74) *Attorney, Agent, or Firm* — Holland & Hart LLP

(57) ABSTRACT

Methods, systems, and devices for scrambling initialization indication for higher bands are described. For example, a user equipment (UE) may receive a synchronization signal block (SSB) from a base station, the SSB including a primary synchronization signal (PSS), a data payload, and a demodulation reference signal (DMRS). The UE may identify a first part of a cell identifier (ID) of the base station, a second part of the cell ID, or both, indicated in a sequence of the DMRS, indicated in the data payload, or a combination thereof. The UE may monitor for a message from the base station based on identifying the cell ID.

30 Claims, 20 Drawing Sheets

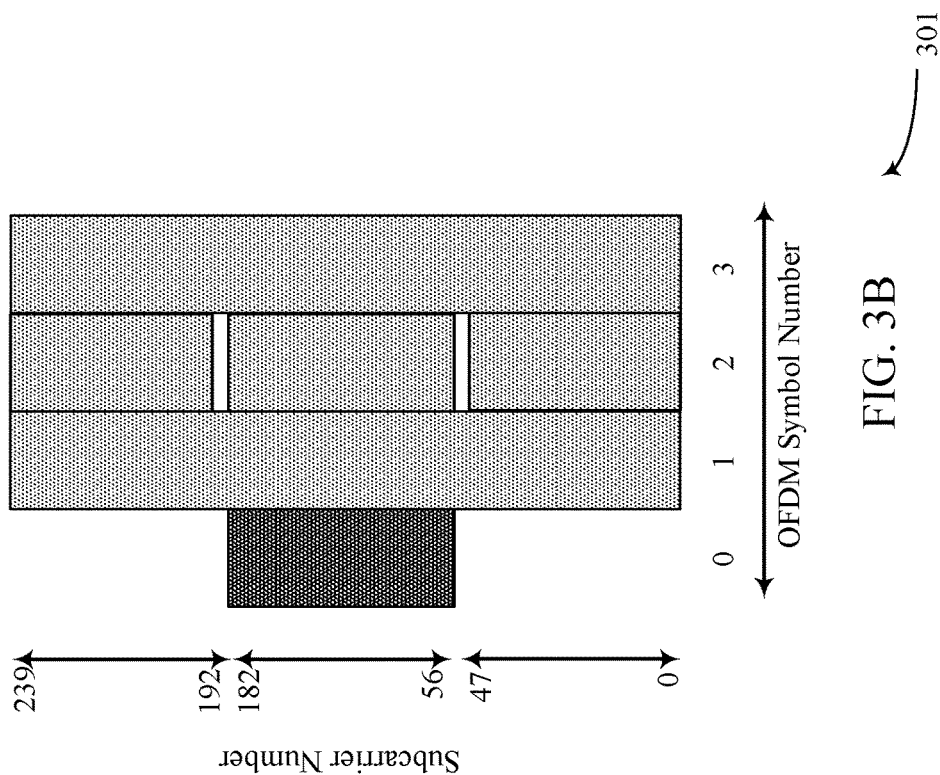
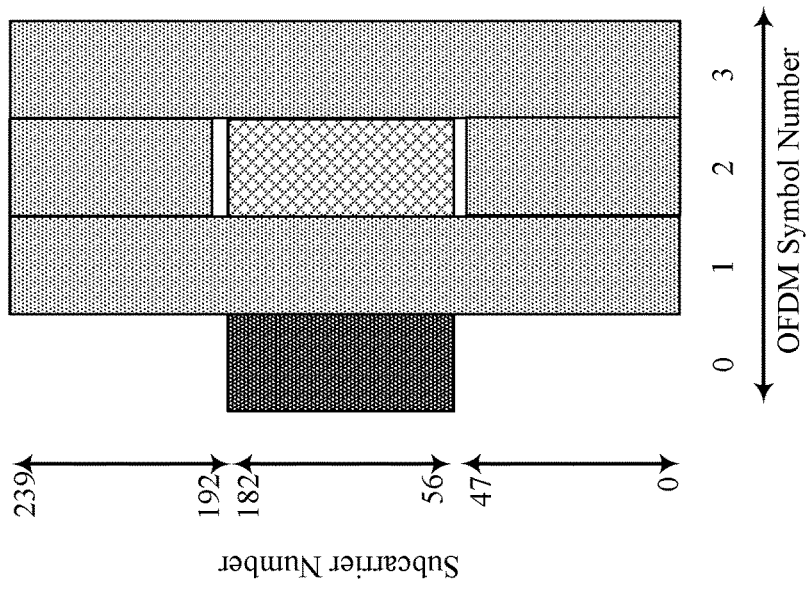

SCRAMBLING INITIALIZATION INDICATION FOR HIGHER BANDS

FIELD OF TECHNOLOGY

The following relates to wireless communications, including scrambling initialization indication for higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, base stations may transmit synchronization signal blocks (SSBs) to one or more proximal user equipments (UEs). Each SSB may include a primary synchronization signal (PSS), a secondary synchronization signal (SSS), a physical broadcast channel (PBCH), and one or more demodulation reference signals (DMRSs) interleaved within the time-frequency resources of the PBCH. A UE receiving an SSB may use the PSS and the SSS to identify a cell identifier (ID) corresponding to the base station. The UE may use the cell ID to demodulate and descramble the PBCH, the DMRSs, and other cell-specific signaling from the base station. In some cases, the cell ID may be segmented into two parts, where the UE may use the PSS to identify a second part of the cell ID. Further, the UE may use the SSS, along with the second part of the cell ID, to identify a first part of the cell ID.

SUMMARY

The described techniques relate to improved methods, systems, devices, and apparatuses that support scrambling initialization indication for higher bands. Generally, the described techniques provide for indicating a first part of a cell identifier (ID) with a primary synchronization signal (PSS), a physical broadcast channel (PBCH), or one or more demodulation reference signals (DMRSs), for example, to refrain from transmitting secondary synchronization signals (SSSs) in synchronization signal blocks (SSBs). In such cases, a base station may indicate the first part of the cell ID, the second part of the cell ID, or both, with some combination of the PSS, the PBCH, and the DMRSs. A user equipment (UE) may receive an SSB and identify the first part of the cell ID, a second part of the cell ID, or both in the SSB. In one example, the base station may indicate both the first part and the second part of the cell ID in a sequence of the PSS. In another example, the base station may indicate the first part of the cell ID in a sequence of the DMRSs. In yet another example, the base station may indicate the first part of the cell ID in the PBCH.

A method for wireless communication at a UE is described. The method may include receiving a SSB from a base station, the SSB including a PSS, a data payload, and a DMRS, identifying a first part and a second part of a cell ID of the base station based on at least one of the first part or the second part of the cell ID being indicated in a sequence of the DMRS, or indicated in the data payload, or both, and monitoring for a message from the base station based on the cell ID.

An apparatus for wireless communication at a UE is described. The apparatus may include a processor, memory coupled with the processor, and instructions stored in the memory. The instructions may be executable by the processor to cause the apparatus to receive a SSB from a base station, the SSB including a PSS, a data payload, and a DMRS, identify a first part and a second part of a cell ID of the base station based on at least one of the first part or the second part of the cell ID being indicated in a sequence of the DMRS, or indicated in the data payload, or both, and monitor for a message from the base station based on the cell ID.

Another apparatus for wireless communication at a UE is described. The apparatus may include means for receiving a SSB from a base station, the SSB including a PSS, a data payload, and a DMRS, means for identifying a first part and a second part of a cell ID of the base station based on at least one of the first part or the second part of the cell ID being indicated in a sequence of the DMRS, or indicated in the data payload, or both, and means for monitoring for a message from the base station based on the cell ID.

A non-transitory computer-readable medium storing code for wireless communication at a UE is described. The code may include instructions executable by a processor to receive a SSB from a base station, the SSB including a PSS, a data payload, and a DMRS, identify a first part and a second part of a cell ID of the base station based on at least one of the first part or the second part of the cell ID being indicated in a sequence of the DMRS, or indicated in the data payload, or both, and monitor for a message from the base station based on the cell ID.

In some examples of the method, apparatuses, and non-transitory computer-readable medium described herein, receiving the SSB may include operations, features, means, or instructions for receiving the SSB including a master information block (MIB) in the data payload, where the MIB includes at least one of the first part of the cell ID, the second part of the cell ID, or both.

In some examples of the method, apparatuses, and non-transitory computer-readable medium described herein, receiving the SSB may include operations, features, means, or instructions for receiving the SSB including one or more PBCH bits of the data payload multiplexed in a physical layer, where the PBCH bits indicate at least one of the first part of the cell ID, the second part of the cell ID, or both.

In some examples of the method, apparatuses, and non-transitory computer-readable medium described herein, receiving the SSB may include operations, features, means, or instructions for receiving the SSB including the PSS that may be generated using a sequence indicating the first part of the cell ID and the second part of the cell ID.

In some examples of the method, apparatuses, and non-transitory computer-readable medium described herein, receiving the SSB may include operations, features, means, or instructions for receiving the data payload via a PBCH of the SSB.

Some examples of the method, apparatuses, and non-transitory computer-readable medium described herein may further include operations, features, means, or instructions for demodulating the PBCH to obtain scrambled data based on the sequence of the DMRS and descrambling the scrambled data to obtain at least a portion of the data payload based on a second sequence initialized by the first part of the cell ID, the second part of the cell ID, or both.

Some examples of the method, apparatuses, and non-transitory computer-readable medium described herein may further include operations, features, means, or instructions for demodulating the PBCH to obtain scrambled data based on the sequence of the DMRS and descrambling the scrambled data to obtain at least a portion of the data payload based on a second sequence initialized by an index of the SSB.

Some examples of the method, apparatuses, and non-transitory computer-readable medium described herein may further include operations, features, means, or instructions for demodulating a PBCH of the SSB based on the sequence of the DMRS being initialized by the second part of the cell ID.

Some examples of the method, apparatuses, and non-transitory computer-readable medium described herein may further include operations, features, means, or instructions for demodulating a PBCH of the SSB based on the sequence of the DMRS being initialized by an index of the SSB.

Some examples of the method, apparatuses, and non-transitory computer-readable medium described herein may further include operations, features, means, or instructions for receiving the message from the base station, where at least a portion of the message may be generated based on the first part of the cell ID, the second part of the cell ID, or both.

Some examples of the method, apparatuses, and non-transitory computer-readable medium described herein may further include operations, features, means, or instructions for descrambling the portion of the message using the first part of the cell ID, the second part of the cell ID, or both.

A method for wireless communication at a base station is described. The method may include transmitting a SSB to a UE, the SSB including a PSS, a data payload, and a DMRS, where at least one of a first part or a second part of a cell ID of the base station is indicated in a sequence of the DMRS, indicated in the data payload, or both and transmitting, to the UE, a message that is generated based on the first part of the cell ID, the second part of the cell ID, or both.

An apparatus for wireless communication at a base station is described. The apparatus may include a processor, memory coupled with the processor, and instructions stored in the memory. The instructions may be executable by the processor to cause the apparatus to transmit a SSB to a UE, the SSB including a PSS, a data payload, and a DMRS, where at least one of a first part or a second part of a cell ID of the base station is indicated in a sequence of the DMRS, indicated in the data payload, or both and transmit, to the UE, a message that is generated based on the first part of the cell ID, the second part of the cell ID, or both.

Another apparatus for wireless communication at a base station is described. The apparatus may include means for transmitting a SSB to a UE, the SSB including a PSS, a data payload, and a DMRS, where at least one of a first part or a second part of a cell ID of the base station is indicated in a sequence of the DMRS, indicated in the data payload, or both and means for transmitting, to the UE, a message that is generated based on the first part of the cell ID, the second part of the cell ID, or both.

A non-transitory computer-readable medium storing code for wireless communication at a base station is described. The code may include instructions executable by a processor to transmit a SSB to a UE, the SSB including a PSS, a data payload, and a DMRS, where at least one of a first part or a second part of a cell ID of the base station is indicated in a sequence of the DMRS, indicated in the data payload, or both and transmit, to the UE, a message that is generated based on the first part of the cell ID, the second part of the cell ID, or both.

In some examples of the method, apparatuses, and non-transitory computer-readable medium described herein, transmitting the SSB may include operations, features, means, or instructions for transmitting the SSB including an indication of the first part of the cell ID, or the second part of the cell ID, or both, within a MIB of the data payload.

In some examples of the method, apparatuses, and non-transitory computer-readable medium described herein, transmitting the SSB may include operations, features, means, or instructions for transmitting the SSB including an indication of the first part, or the second part, or both, of the cell ID within PBCH bits of the data payload multiplexed at a physical layer.

In some examples of the method, apparatuses, and non-transitory computer-readable medium described herein, and the method, apparatuses, and non-transitory computer-readable medium may include further operations, features, means, or instructions for transmitting the SSB including an indication of the first part and the second part of the cell ID in a sequence of the PSS.

In some examples of the method, apparatuses, and non-transitory computer-readable medium described herein, transmitting the SSB may include operations, features, means, or instructions for transmitting the data payload via a PBCH.

Some examples of the method, apparatuses, and non-transitory computer-readable medium described herein may further include operations, features, means, or instructions for scrambling at least a portion of the data payload of the PBCH using a sequence initialized by the first part of the cell ID, the second part of the cell ID, or both.

Some examples of the method, apparatuses, and non-transitory computer-readable medium described herein may further include operations, features, means, or instructions for scrambling at least a portion of the data payload of the PBCH using a sequence initialized by an index of the SSB.

In some examples of the method, apparatuses, and non-transitory computer-readable medium described herein, transmitting the SSB may include operations, features, means, or instructions for transmitting the DMRS that may be generated based on the sequence of the DMRS being initialized by the second part of the cell ID.

In some examples of the method, apparatuses, and non-transitory computer-readable medium described herein, transmitting the SSB may include operations, features, means, or instructions for transmitting the DMRS that may be generated based on the sequence of the DMRS being initialized by an index of the SSB.

In some examples of the method, apparatuses, and non-transitory computer-readable medium described herein, transmitting the message may include operations, features, means, or instructions for scrambling at least a portion of the message based on the first part of the cell ID, the second part of the cell ID, or both.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 3A and 3B illustrate examples of resource configurations that support scrambling initialization indication for higher bands in accordance with aspects of the present disclosure.

DETAILED DESCRIPTION

Figure 1:
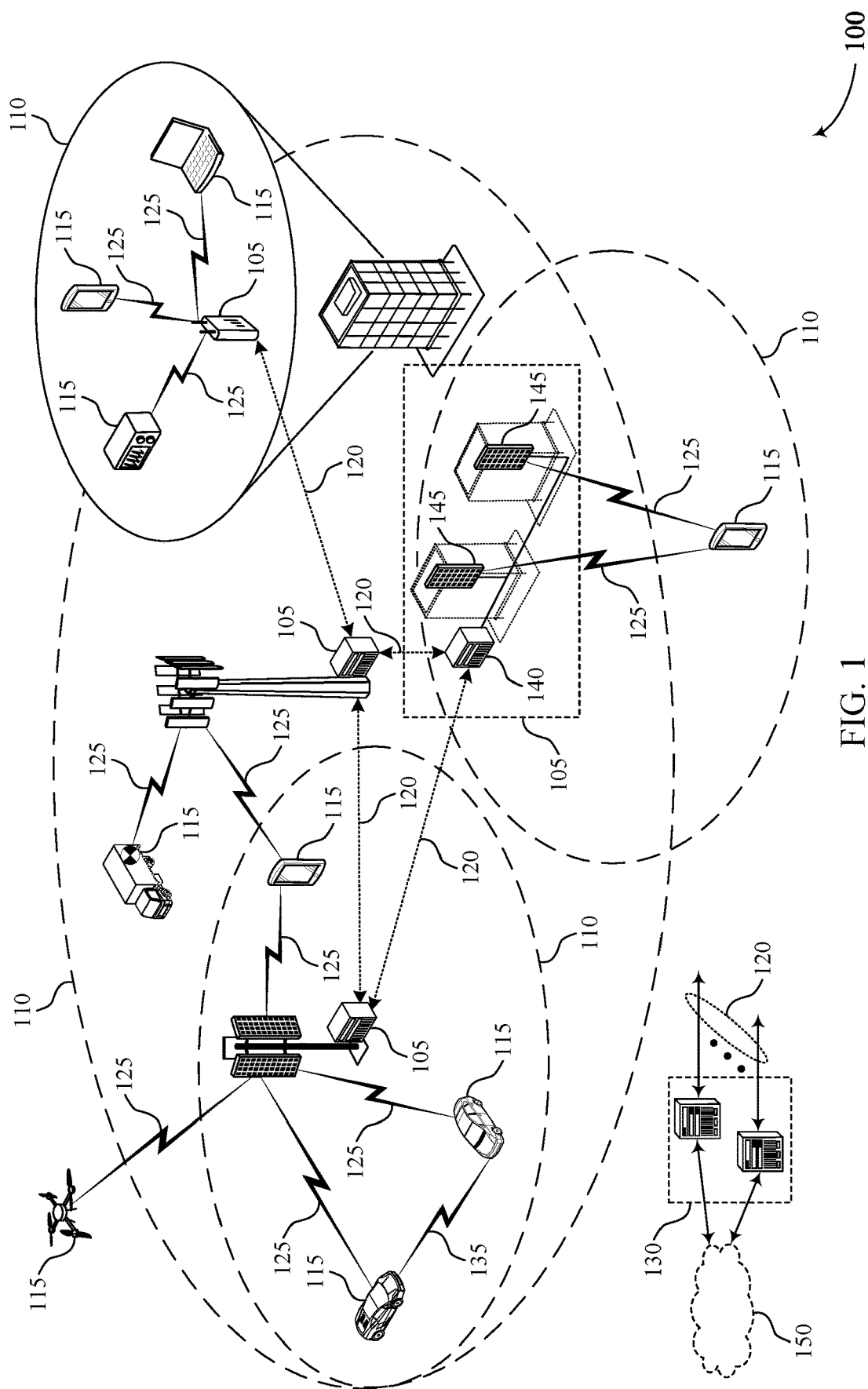
FIGS. 1 and 2 illustrate examples of wireless communications systems that support scrambling initialization indication for higher bands in accordance with aspects of the present disclosure.

In some wireless communications systems, a base station may transmit synchronization signal blocks (SSBs) support, among other examples, initial cell search procedures. For example, the base station may transmit an SSB to a user equipment (UE), where the UE may use the SSB to identify the base station. In some cases, SSBs may include four orthogonal frequency division multiplexing (OFDM) symbols with one symbol for a primary synchronization signal (PSS), two symbols for a data payload, and in some cases, one symbol for both a secondary synchronization signal (SSS) and the data payload. The UE may use the PSS to determine both a time and frequency alignment of the SSB as well as a part of a cell identifier (ID) corresponding to the base station. That is, the UE may identify the PSS and may identify a symbol timing of the SSB, an initial frequency offset estimation, and a second part of the cell ID of the base station. Knowing the timing and frequency alignment of the SSB and the second part of the cell ID, the UE may use the SSS to determine a first part of the cell ID.

Upon identifying the cell ID, the UE may receive and decode a physical broadcast channel (PBCH), for example, to identify information within the data payload. In some cases, the base station may include one or more demodulation reference signals (DMRSs) in the PBCH to support coherent demodulation of the PBCH. In some cases, the PBCH may be scrambled using a sequence initialized by the cell ID of the base station and a DMRS sequence may be initialized by the cell ID of the base station. For higher frequency bands (e.g., frequency range (FR) 1, FR2), relatively narrow beams and relatively small cell ranges may be used. Thus, having many possible cell IDs, and thus, a large quantity of scrambling initialization combinations may be unnecessary, such as when initializing PBCH scrambling. In such cases, spatial and temporal granularity of transmitted SSBs may be improved, mitigating transmitting signals with high scrambling complexity.

In some examples, wireless communications systems may support a base station transmitting SSBs indicating the first part of the cell ID with some combination of a PSS, a PBCH, and one or more DMRSs, for example, to refrain from transmitting SSS in SSBs. In one example, the base station may indicate both the first part of the cell ID and the second part of the cell ID using a sequence of the PSS. In another example, the base station may indicate the first part of the cell ID in a sequence of the DMRSs. In yet another example, the base station may indicate the first part of the cell ID in the PBCH. For example, the base station may indicate the first part of the cell ID within a master information block (MIB) of the PBCH. In another example, the base station may indicate the first part of the cell ID within multiplexed layer 1 (L1) bits of the PBCH. In such examples, the second part of the cell ID may be indicated by the sequence of the PSS.

To support such methods of indicating the first part of the cell ID, the base station may scramble the PBCH using a sequence initialized by the cell ID, for example, initialized by the first part of the cell ID, the second part of the cell ID, or both. Further, in some examples, the base station may scramble the PBCH using a sequence initialized by a candidate SSB index (e.g., a beam index of a beam used to transmit the associated SSB). The PBCH may be scrambled using a sequence initialized by any combination of the first part of the cell ID, the second part of the cell ID, and the candidate SSB index such that the UE may receive an SSB, without the SSS field, and descramble the PBCH.

In some examples, and in accordance with the techniques described above the base station may initialize the DMRS sequence using the second part of the cell ID, the candidate SSB index, or both. In some examples, the DMRS sequence may be initialized by any combination of the second part of the cell ID and the candidate SSB index such that the may identify the DMRS, decode the DMRS, and coherently demodulate the PBCH (e.g., scrambled using a sequence initialized by the first part of the cell ID, the second part of the cell ID, the candidate SSB index, or any combination thereof).

Configuring the base station to indicate the first part of the cell ID according to the alternative methods described herein (e.g., when refraining from transmitting the SSS) may reduce UE complexity while maintaining sufficient channel coding performance. For example, eliminating UE searching procedures for the SSS may reduce UE complexity, while indicating the first part of the cell ID in a different portion of the SSB may retain a number of potential cell ID values thereby maintaining robust channel scrambling (e.g., using the cell ID).

Aspects of the disclosure are initially described in the context of wireless communications systems. Aspects of the disclosure are also described in the context of resource configurations and process flows. Aspects of the disclosure are further illustrated by and described with reference to apparatus diagrams, system diagrams, and flowcharts that relate to scrambling initialization indication for higher bands.

FIG. 1 illustrates an example of a wireless communications system 100 that supports scrambling initialization indication for higher bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may transmit one or more SSBs to one or more UEs 115. The base station 105 may transmit an SSB containing a PSS, an SSS, a data payload, and one or more DMRSs. In some cases, a UE 115 may use the PSS and the SSS (e.g., in tandem) to determine a cell ID corresponding to the base station 105. For example, the UE 115 may use the PSS to determine, among other communication aspects, a second part of the cell ID. In such examples, the UE 115 may use the SSS to determine a first part of the cell ID. The UE 115 may combine the first part of the cell ID and the second part of the cell ID to produce the cell ID. In some cases, a sequence of the DMRS, a scrambling of a PBCH, and the like may be initialized by the cell ID. The combination of the first part of the cell ID and the second part of the cell ID may produce a large quantity (e.g., 1008) of scrambling initialization combinations. However, for higher frequency bands, relatively narrow beams and relatively small cell ranges may be used, as compared to lower frequency bands (e.g., frequency bands associated with LTE) where having 1008 scrambling initialization combinations (e.g., cell IDs) may be unnecessary.

In some examples, the base station 105 may transmitting SSBs, indicating the first part of the cell ID with some combination of a PSS, a PBCH, and one or more DMRSs, for example, to refrain from transmitting SSS in SSBs. In one example, the base station 105 may indicate both the first part of the cell ID and the second part of the cell ID using a sequence of the PSS. In another example, the base station 105 may indicate the first part of the cell ID in a sequence of the DMRSs. In yet another example, the base station 105-a may indicate the first part of the cell ID in the PBCH.

To support such methods of indicating the first part of the cell ID, the base station 105 may scramble the PBCH using a sequence initialized by the cell ID, for example, initialized by the first part of the cell ID, the second part of the cell ID, or both. Further, in some examples, the base station 105 may scramble the PBCH using a sequence initialized by a candidate SSB index (e.g., a beam index of the beam used to transmit the associated SSB). In some examples, and in accordance with the techniques described above the base station 105 may initialize the DMRS sequence using the second part of the cell ID, the candidate SSB index, or both. In some examples, the DMRS sequence may be initialized by any combination of the second part of the cell ID and the candidate SSB index such that the UE 115 may identify the DMRS, decode the DMRS, and coherently demodulate the PBCH (e.g., scrambled using a sequence initialized by the first part of the cell ID, the second part of the cell ID, the candidate SSB index, or any combination thereof).

Figure 2:
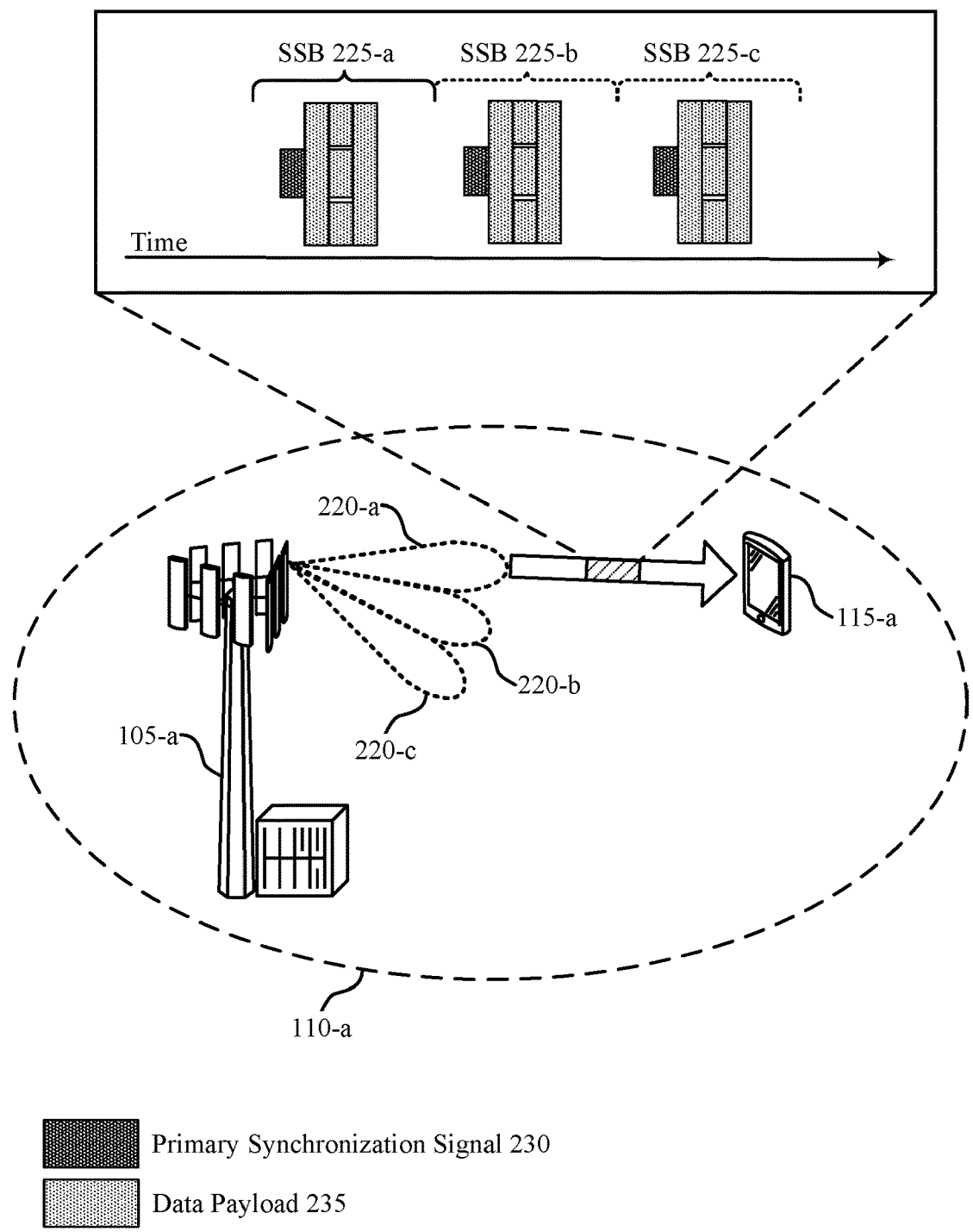

FIG. 2 illustrates an example of a wireless communications system 200 that supports scrambling initialization indication for higher bands in accordance with aspects of the present disclosure. The wireless communications system 200 may implement or be implemented by aspects of the wireless communications system 100. For example, the wireless communications system 200 may include a base station 105-a and a UE 115-a, which may be examples of corresponding devices described with reference to FIG. 1.

The base station 105-a may communicate with the UE 115-a in a geographic coverage area 110-a, which may be an example of a geographic coverage area 110 described with reference to FIG. 1. The base station 105-a may transmit one or more SSBs 225 to respective UEs 115, in some cases, without SSS fields.

In some cases, the base station 105-a may transmit SSBs 225 (e.g., synchronization signals (SSs) or PBCH blocks) to support, among other examples, initial cell search procedures. For example, the base station 105-a may transmit SSB 225-a to the UE 115-a, where the UE 115-a may use the SSB 225-a to identify the base station 105-a and, in some cases, to perform a channel access procedure therewith. The base station 105-a may transmit SSBs 225 using four OFDM symbols with one symbol for a PSS 230, two symbols for a data payload 235, and in some cases, one symbol for both an SSS and the data payload 235 where the SSS and the data payload 235 are FDMed in the symbol. Time-frequency allocation for such SSBs 225 is described in more detail with respect to FIG. 3.

In some cases, the base station 105-a may transmit the PSS 230 using a length 127 frequency domain-based M-sequence. That is, the base station 105-a may transmit the PSS 230 using 127 subcarriers. The base station 105-a may transmit the PSS 230 according to one of three possible sequences, where to descramble the SSB 225-a, the UE 115-a may identify at least the sequence (e.g., of the three possible sequences) of the PSS 230. In some cases, the base station 105-a may transmit the SSS using a length 127 frequency domain-based Gold Code sequence (e.g., 2 M-sequences). That is, the base station 105-a may transmit the SSS using 127 subcarriers. The base station 105-a may transmit the SSS according to one of 336 possible sequences, where to descramble the SSB 225-a, the UE 115-a may identify the sequence (e.g., of the 336 possible sequences) of the SSS. Combining the quantity of possible sequences of the PSS 230 and the quantity of possible sequences of the SSS, the SSB 225-a may have a large quantity of possible sequences (e.g., 1008 sequences). In some cases, the base station 105-a may transmit the data payload on a PBCH of the SSB 225-a. The base station 105-a may also interleave DMRS within the symbols of the PBCH supporting demodulation of the PBCH. For example, the PBCH may be quadrature phase shift keying (QPSK) modulated, where the UE 115-a may receive the SSB 225-a and coherently demodulate the PBCH using the associated (e.g., interleaved) DMRS.

In some cases, during an initial cell search, the UE 115-a (e.g., a UE searcher) may be configured to use a sliding window and a correlation technique to search for PSS 230. For example, during a timing hypothesis, the UE 115-a may parse through the three sequences associated with PSS 230 at N frequency hypotheses. If the UE 115-a does not identify the PSS 230, the UE 115-a may parse through the three sequences associated with PSS 230 at a different frequency hypothesis (e.g., a different one of the N hypotheses), and at a different timing hypothesis. Searching for the PSS 230 in this way may enable the UE 115-a to mitigate doppler effects, internal clock frequency shifts, and any other frequency errors. Once the UE 115-a identifies the PSS 230 and the sequence associated therewith, the UE 115-a may identify the SSS and decode the SSB 225-a.

The UE 115-a may use the PSS 230 to determine both a time and frequency alignment of the SSB 225-a as well as a part of a cell ID corresponding to the base station 105-a. That is, the UE 115-a may identify the PSS 230 and may identify a symbol timing of the SSB 225-a (e.g., and thus a symbol timing associated with the base station 105-*a*), an initial frequency offset estimation, and a second part of the cell ID (e.g., $N_{ID}^{(2)}$) of the base station 105-*a*. In some cases, the UE 115-*a* may reference the sequence of the PSS 230 to identify the second part of the cell ID. For example, the PSS 230 may be M-sequence-based (e.g., length 127) with three possible sequences, where each sequence associated with PSS 230 may be mapped to a respective value for the second part of the cell ID. In other words, the second part of the cell ID may take on one of three possible values. For example, the second part of the cell ID may be equal to 0, 1, or 2 (e.g., $N_{ID}^{(2)}$=0, 1, 2), where the sequence of the PSS 230 may indicate to the UE 115-*a* which second part of the cell ID to use. In some cases, the PSS 230 may be included in a single symbol of the SSB 225.

Knowing the timing and frequency alignment of the SSB 225-*a* and the second part of the cell ID, as determined from the PSS 230, the UE 115-*a* may use the SSS to determine a first part of the cell ID (e.g., $N_{ID}^{(1)}$). In some cases, the first part of the cell ID may be mapped to a respective sequence of the SSS. That is, the first part of the cell ID may take on one of 336 possible values, where the UE 115-*a* may parse through the possible sequences of the SSS, determine the sequence of the SSS, and determine the value of the first part of the cell ID. In some cases, the first part of the cell ID may be associated with one or more cyclic shifts used to generate the SSS sequence. For example, a first cyclic shift, $m_0$, may be equal to a combination of the first part of the cell ID and the second part of the cell ID $$\left(e.g., m_0 = \left(3\left\lfloor\frac{N_{ID}^{(1)}}{112}\right\rfloor + N_{ID}^{(2)}\right)5\right)$$

and a second cyclic shift, $m_1$, may be equal to an operation with the first part of the cell ID (e.g., $m_1 = (N_{ID}^{(1)} \mod(112))$). The UE 115-*a* may calculate the cell ID of the base station 105-*a* by combining the first part of the cell ID and the second part of the cell ID (e.g., $N_{ID}^{cell} = 3N_{ID}^{(1)} = N_{ID}^{(2)}$. In some cases, the SSS may be a generated from a sequence of length 127 and be included in a single symbol period of an SSB 225

Upon identifying the cell ID, the UE 115-*a* may receive and decode the PBCH, for example, to identify information within the data payload 235. The UE 115-*a* may know a timing and frequency of the PBCH, for example based on identifying the timing and frequency alignment of the SSB 225-*a*. In some cases, the PBCH may include a quantity of resource elements (e.g., 240×2₄₈+48=576 resource elements). For example, in cases where the SSS is included in the SSB 225-*a*, the PBCH may include 576 resource elements. The PBCH may carry an MIB which may include control information used by the UE 115-*a*, for example, in a channel access procedure. As an illustrative example, the PBCH may include the MIB with respective bit allocations as described with Table 1.

TABLE 1

| MIB | |
|---|---|
| Parameter | Number of Bits |
| SFN | 6 bits |
| SCS Common | 1 bit |
| | 15 or 60, 30 or 160 |
| SSB Subcarrier Offset (KSSB) | 4 bits |

TABLE 1-continued

| MIB | |
|---|---|
| Parameter | Number of Bits |
| DMRS typeA Position | 1 bit |
| Pdcch-ConfigSIB 1 | 4 bits |
| controlResource SetZero | 4 bits |
| searchSpaceZero | |
| Cell Barred | 1 bit |
| IntraFreq Reselection | 1 bit |
| Spare | 1 bit |

In some cases, the bit field for the SCS Common parameter may be associated with a configured frequency range. For example, in cases where the base station 105-*a* and the UE 115-*a* use the FR1 band, the SCS Common parameter may be indicated using one bit to indicate whether the SCS is 15 kHz or 30 kHz. In another example, the base station 105-*a* and the UE 115-*a* may use the FR2 band and the SCS Common parameter may be associated with one bit to indicate whether the SCS is 60 kHz or 120 kHz. Further, in some cases, the PBCH may include one or more multiplexed bits, for example, in L1 signaling. As an illustrative example, the PBCH may include the multiplexed L1 bits with respective bit allocations as described with Table 2.

TABLE 2

| PBCH Multiplexed Bits in L1 | |
|---|---|
| Parameter | Number of Bits |
| SFN | 4 bits |
| Half-frame Bit | 1 bit |
| MSB of SSB Index | 3 bits |

In some cases, the PBCH may be QPSK modulated. The base station 105-*a* may include one or more DMRSs in the PBCH to support coherent demodulation of the PBCH (e.g., QPSK modulated PBCH) and channel estimation at a receiving UE 115. Phrased alternatively, a UE 115 may use received DMRSs for channel estimation, allowing the UE 115 to demodulate signals on the channel corresponding to the DMRSs. For example, the PBCH of the SSB 225-*a* may be QPSK modulated and may include one or more DMRSs. The UE 115-*a* may receive the DMRSs and may coherently demodulate the QPSK modulated PBCH. In some cases, usages for DMRS in the PBCH may be for channel estimation and determining three least significant bits (LSBs) (e.g., for FR2) of an SSB index per half frame from the DMRS sequence index. In some cases, a UE 115-*a* may decode a DMRS and may identify an SSB based on decoding the DMRS. For example, the base station 105-*a* may transmit SSB 225-*a* using beam 220-*a*, SSB 225-*b* using beam 220-*b*, and SSB-c using beam 220-*c*. The base station 105-*a* may transmit each SSB 225 with respective DMRS signaling, distinguishing between the beams 220 used to transmit the SSBs 225. Phrased alternatively, the base station 105-*a* may associate an SSB index (e.g., a beam index) with each SSB 225, where a receiving UE 115 may identify the SSB index associated with a received SSB 225 based on decoding the DMRS in the received SSB 225. For example, the UE 115-*a* may receive SSB 225-*a* where the UE 115-*a* may identify the SSB index, corresponding to beam 220-*a*, based on decoding the DMRS interleaved in the PBCH of the SSB 225-*a*.

In some cases, the UE 115-a may identify a subset of bits associated with the SSB index in response to decoding the DMRS. For example, the UE 115-a may identify the three LSBs of the SSB index based on decoding the DMRS. In such an example, the UE 115-a may identify one or more most significant bits (MSBs) of the SSB index referencing, or otherwise based on the multiplexed L1 bits as described with reference to Table 2. In any case, the UE 115-a may use the DMRSs to demodulate the PBCH supporting successful reception and decoding of the data payload 235. In some cases, the base station 105-a may interleave the DMRSs within the resource elements of the PBCH according to a pattern. For example, the base station 105-a may include a DMRS in the PBCH every fourth subcarrier (e.g., 60×2+ 12+12=144 resource elements). To support such a pattern, the base station 105-a may indicate, to the UE 115-a, a starting DMRS, a DMRS bundling pattern, a DMRS temporal repetition, among other parameters supporting DMRS pattern configuration. In some cases, the UE 115-a may use DMRS, SSS, and PSS 230 signaling in SSBs 225 to refine a frequency offset estimation. That is, the UE 115-a may receive the SSB 225-a and may fine-tune a frequency alignment with the base station 105-a.

In some cases, wireless communications system 200 may operate using higher frequency bands, for example, to support larger bandwidths. For example, in higher NR operating bands, larger bandwidths may be used, and several waveforms are being considered for downlink and uplink (UL/DL) operation. In some cases, wireless communications system 200 may use CP-OFDM waveforms. CP-OFDM waveforms are cyclic prefix based and may be associated with relatively high complexity (e.g., as compared to a time division (TD) waveform). Further, devices communicating with CP-OFDM waveforms may perform single tap frequency domain equalization (FDE) and may efficiently use a communication bandwidth (e.g., due to frequency multiplexing of the bandwidth). CP-OFDM communications are associated with relatively easy FDM (e.g., as compared to other OFDM communications), may use relatively higher SCS (e.g., as compared to a TD waveform), and may support a higher order MIMO scheme.

In some cases, wireless communications system 200 may use single carrier (SC) frequency division (FD) waveforms, such as DFT-s-OFDM waveforms. SC-FD waveforms may include cyclic prefix implementations (e.g., dividing symbols with cyclic prefixes) or guard interval implementations (e.g., dividing symbols with quiet periods) and may be associated with relatively high complexity (e.g., as compared to a TD waveform). Further, devices communicating with SC-FD waveforms may perform single tap FDE and may efficiently use a communication bandwidth (e.g., due to frequency multiplexing). In some cases, SC-FD waveforms may be associated with relatively high peak to average power ratio (PAPR), and may use relatively higher SCS (e.g., as compared to a TD waveform).

In some other cases, wireless communications system 200 may use SC-TD waveforms, such as SC-QAM waveforms. SC-TD waveforms may include cyclic prefix implementations or guard interval implementations and may be associated with relatively low complexity (e.g., as compared to an FD waveform). Further, devices communicating with SC-TD waveforms may perform single tap FDE or time domain equalization (TDE), may use guard bands (e.g., FDM with guard bands). In some cases, SC-TD waveforms may be associated with low SNR and low PAPR (e.g., due to time domain filtering). In any case, wireless communications system 200 operating in higher bands may be configured to use such waveforms which to support phase noise mitigation, lower PAPR, lower UE complexity, or any combination thereof.

In some cases, when using SC waveforms, signals may be TDMed, where FDM interleaving DMRS within PBCH resource elements may not be possible for SC-QAM waveforms, or may be possible for DFT-s-OFDM waveforms, but with PAPR impact (e.g., increased PAPR). In such cases, DMRS for SC waveforms may be TDMed with PBCH data. That is, the DMRS may be TDMed within the data payload 235.

In some cases, the PBCH may be scrambled using a sequence initialized by the cell ID of the base station 105-a (using the 2 parts of the cell ID) and the DMRS sequence may be initialized by the cell ID of the base station 105-a (using the 2 parts of the cell ID) and a candidate SSB index (e.g., beam). However, for higher frequency bands, relatively narrow beams and relatively small cell ranges may be used, as compared to lower frequency bands (e.g., frequency bands associated with LTE). Thus, having 1008 scrambling initialization combinations (e.g., cell IDs) may be unnecessary, such as for PBCH. In such cases, spatial and temporal granularity of transmitted SSBs may be improved, mitigating transmitting signals with high scrambling complexity. For example, a beam sweeping time order for different base stations 105 may be chosen to mitigate inter-cell interference (e.g., minimizing colliding beams and transmissions), thus making the PBCH more robust to inter-cell interference. Further, the contents of an MIB may be smaller for higher frequency bands, for example, when using SC-TD waveforms, improving PBCH performance. In such examples, SSBs transmitted with narrower beams and in smaller cell ranges (e.g., as compared to transmissions associated with lower frequencies) may have a reduced risk of being received by unintended UEs, decreasing the need for scrambling and modulation complexity. Still, other channels may use robust scrambling (e.g., using the cell ID) to maintain performance. For example, the base station 105-a may not be configured to design a time allocation or frame timing to mitigate (e.g., minimize) inter-cell interference. Thus, it may be preferred to transmit SSBs in such a way to reduce cell ID identification complexity, while maintaining robust scrambling in one or more other channels. In some cases, the only reason to include SSS in an SSB 225 is to signal the remaining part of the cell ID (e.g., the first part of the cell ID). However, detection using SSS may add to the complexity of the UE. That is, signaling SSS may increase UE complexity when detecting SSBs 225. In cases as described herein, the SSS may be removed from SSBs 225, and the techniques described herein provide an alternative method to signal (or indicate) the first part of the cell ID.

In some examples, wireless communications system 200 may support the base station 105-a transmitting SSBs 225 indicating the first part of the cell ID (e.g., $N_{ID}^{(1)}$) with some combination of a PSS 230, a PBCH, and one or more DMRSs, for example, to refrain from transmitting SSS in SSBs 225. In one example, the base station 105-a may indicate both the first part of the cell ID (e.g., $N_{ID}^{(1)}$) and the second part of the cell ID (e.g., $N_{ID}^{(2)}$) using a sequence used to generate the PSS 230. Phrased alternatively, the UE 115-a may be configured to perform a correlation technique to identify the sequence of the PSS, where in doing so, the UE 115-a may identify the first part of the cell ID and the second part of the cell ID from the PSS. In another example, the base station 105-a may indicate the first part of the cell ID in a sequence used to generate one or more DMRSs. That is, in decoding the DMRSs, the UE 115-a may identify the first part of the cell ID from the DMRS included in the PBCH. In such an example, the second part of the cell ID may be indicated by the sequence of the PSS. In yet another example, the base station 105-*a* may indicate the first part of the cell ID in the PBCH. For example, the base station 105-*a* may indicate the first part of the cell ID within the MIB of the PBCH, for example, in an additional field such as within Table 1. In another example, the base station 105-*a* may indicate the first part of the cell ID within the multiplexed L1 bits of the PBCH, for example, in an additional field such as within Table 2. In such examples, the second part of the cell ID may be indicated by the sequence of the PSS.

To support such methods of indicating the first part of the cell ID, the base station 105-*a* may scramble the PBCH using a sequence initialized by the cell ID, for example, initialized by the first part of the cell ID (e.g., $N_{ID}^{(1)}$ only), the second part of the cell ID (e.g., $N_{ID}^{(2)}$ only), or both (e.g., $N_{ID}^{(1)}+N_{ID}^{(2)}$). Further, in some examples, the base station 105-*a* may scramble the PBCH using a sequence initialized by a candidate SSB index (e.g., a beam index of the beam 220 used to transmit the associated SSB). The PBCH may be scrambled using a sequence initialized by any combination of the first part of the cell ID, the second part of the cell ID, and the candidate SSB index such that the UE 115-*a* may receive an SSB 225, without the SSS field, and descramble the PBCH.

In some examples, and in accordance with the techniques described above the base station 105-*a* may initialize the DMRS sequence using the second part of the cell ID (e.g., $N_{ID}^{(2)}$), the candidate SSB index (e.g., a beam index), or both. In some examples, the DMRS sequence may be initialized by any combination of the second part of the cell ID and the candidate SSB index such that the UE 115-*a* may identify the DMRS, decode the DMRS, and coherently demodulate the PBCH (e.g., scrambled using a sequence initialized by the first part of the cell ID, the second part of the cell ID, the candidate SSB index, or any combination thereof).

Configuring the base station 105-*a* to indicate the first part of the cell ID according to the alternative methods described herein (e.g., when refraining from transmitting the SSS) may reduce UE complexity while maintaining sufficient channel coding performance. For example, eliminating UE searching procedures for the SSS may reduce UE complexity, while indicating the first part of the cell ID in a different portion of the SSB may retain a number of potential cell ID values thereby maintaining robust channel scrambling (e.g., using the cell ID).

FIGS. 3A and 3B illustrate examples of resource configuration 300 and resource configuration 301, respectively, that support scrambling initialization indication for higher bands in accordance with aspects of the present disclosure. In some examples, the resource configurations 300 and 301 may implement aspects of wireless communications system 100 or 200. For example, a base station (e.g., such as base station 105-*a* as described with reference to FIG. 2) may transmit SSBs to one or more UEs (e.g., such as UE 115-*a* as described with reference to FIG. 2) using, or otherwise referencing resource configuration 300 and resource configuration 301. In some examples, the base station may transmit such SSBs without SSS fields, indicating at least a portion of a cell ID in a signal of the SSB different from the SSS.

In some cases, a base station may transmit SSBs to support initial cell search procedures. For example, the base station may transmit an SSB a UE, where the UE may use the SSB to identify the base station and, in some cases, to perform a channel access procedure therewith. The base station may transmit SSBs using four OFDM symbols with one symbol for a PSS 305, at least two symbols for a data payload 315, and in some cases, one symbol for both an SSS 310 and the data payload 315 where the 310 and the data payload 315 are FDMed in the symbol.

In some examples, FIG. 3A may depict resource configuration 300 for the SSB, mapping the PSS 305, the SSS 310, and the data payload 315 to one or more resource elements. The resource configuration 300 may be associated with a carrier including 240 subcarriers, indexed with subcarrier numbers 0 through 239. In some examples, the base station may transmit the PSS 305 during a first OFDM symbol indicated as OFDM symbol number 0. During symbol 0, the base station may transmit the PSS 305 using a frequency domain-based M-sequence of length 127, where the base station may transmit the PSS 305 using 127 subcarriers. In resource configuration 300, the base station may map the PSS 305 to subcarriers indexed 56 through 182 (e.g., 127 subcarriers). The base station may transmit the PSS 305 according to one of three possible sequences as described with reference to FIG. 2. In some examples, the base station may transmit a first portion of the data payload 315 during a second OFDM symbol indicated as OFDM symbol number 1. During symbol 1, the base station may transmit the first portion of the data payload 315 using, in some cases, the entire carrier. That is, the base station may transmit the first portion of the data payload 315 using all 240 subcarriers indexed 0 through 239. In some examples, the base station may transmit both the SSS 310 and a second portion of the data payload 315 during a third OFDM symbol indicated as OFDM symbol number 2. During symbol 2, the base station may transmit the SSS 310 using a frequency domain-based Gold Code sequence (e.g., 2 M-sequences) of length 127, where the base station 105-*a* may transmit the SSS 310 using 127 subcarriers. In resource configuration 300, the base station may map the SSS to subcarriers indexed 56 through 182. Additionally, the base station may transmit the second portion of the data payload 315 on subcarriers around the SSS 310. In resource configuration 300, the base station may map the second portion of the data payload 315 to subcarriers indexed 0 through 47 and subcarriers indexed 192 through 239. In some examples, the base station may transmit a third portion of the data payload 315 during a fourth OFDM symbol indicated as OFDM symbol number 3. During symbol 3, the base station may transmit the third portion of the data payload 315 using, in some cases, the entire carrier. That is, the base station may transmit the third portion of the data payload 315 using all 240 subcarriers indexed 0 through 239. In some examples, the base station may interleave DMRS signals within the subcarriers of the data payload 315 (e.g., the first portion of the data payload 315, the second portion of the data payload 315, the third portion of the data payload 315). For example, the base station may transmit a DMRS every fourth subcarrier. The base station may transmit such DMRS according to a DMRS pattern which may be initialized and configured as described with reference to FIG. 2.

In some cases, the base station may transmit SSBs using higher frequency bands, such that the base station may use relatively narrow beams and relatively small transmission ranges. Thus, the spatial granularity of transmitted SSBs may be improved, mitigating a need for transmitting signals with high scrambling complexity. In such cases, the base station may transmit SSBs without the SSS 310, for example, the base station may transmit SSBs in accordance with resource configuration 301 as described with reference to FIG. 3B.

In some examples, FIG. 3B may depict resource configuration 301 for the SSB, mapping the PSS 305 and the data payload 315 to one or more resource elements. The resource configuration 301 may be associated with a carrier including 240 subcarriers, indexed with subcarrier numbers 0 through 239. In some examples, the base station may transmit the PSS 305 during a first OFDM symbol indicated as OFDM symbol number 0. During symbol 0, the base station may transmit the PSS 305 using a frequency domain-based M-sequence of length 127, where the base station may transmit the PSS 305 using 127 subcarriers. In resource configuration 300, the base station may map the PSS 305 to subcarriers indexed 56 through 182 (e.g., 127 subcarriers). The base station may transmit the PSS 305 according to one of three possible sequences as described with reference to FIG. 2. In some examples, the base station may transmit a first portion of the data payload 315 during a second OFDM symbol indicated as OFDM symbol number 1. During symbol 1, the base station may transmit the first portion of the data payload 315 using, in some cases, the entire carrier. That is, the base station may transmit the first portion of the data payload 315 using all 240 subcarriers indexed 0 through 239. In some examples, the base station may transmit both a second portion of the data payload 315 during a third OFDM symbol indicated as OFDM symbol number 2. During symbol 2, the base station may transmit the second portion of the data payload 315 on subcarriers, in some cases, replacing an SSS 310 such as SSS 310 as described with reference to FIG. 3A. In resource configuration 301, the base station may map the second portion of the data payload 315 to subcarriers indexed 0 through 47, subcarriers indexed 56 through 182, and subcarriers indexed 192 through 239. In other examples, the base station may transmit the second portion of the data payload using all subcarriers indexed 0 through 239. In some examples, the base station may transmit a third portion of the data payload 315 during a fourth OFDM symbol indicated as OFDM symbol number 3. During symbol 3, the base station may transmit the third portion of the data payload 315 using, in some cases, the entire carrier. That is, the base station may transmit the third portion of the data payload 315 using all 240 subcarriers indexed 0 through 239. In some examples, the base station may interleave DMRS signals within the subcarriers of the data payload 315 (e.g., the first portion of the data payload 315, the second portion of the data payload 315, the third portion of the data payload 315). For example, the base station may transmit a DMRS every fourth subcarrier. The base station may transmit such DMRS according to a DMRS pattern which may be initialized and configured as described with reference to FIG. 2.

To support transmitting SSBs without SSS 310, the base station may indicate information, otherwise signaled with the SSS 310, with the PSS 305, the PBCH, a DMRS, or a combination thereof. For example, the base station may transmit an SSB to a UE without SSS 310, where the base station may indicate a first part of a cell ID using the PSS 305, the PBCH, a DMRS, or a combination thereof as described with reference to FIG. 2. Configuring the base station to transmit, and the UE to receive, SSBs excluding the SSS 310 while signaling the first part of the cell ID may reduce signaling complexity and UE complexity, while maintaining a sufficient channel coding complexity (e.g., if a channel is encoded with the cell ID).

Figure 4:
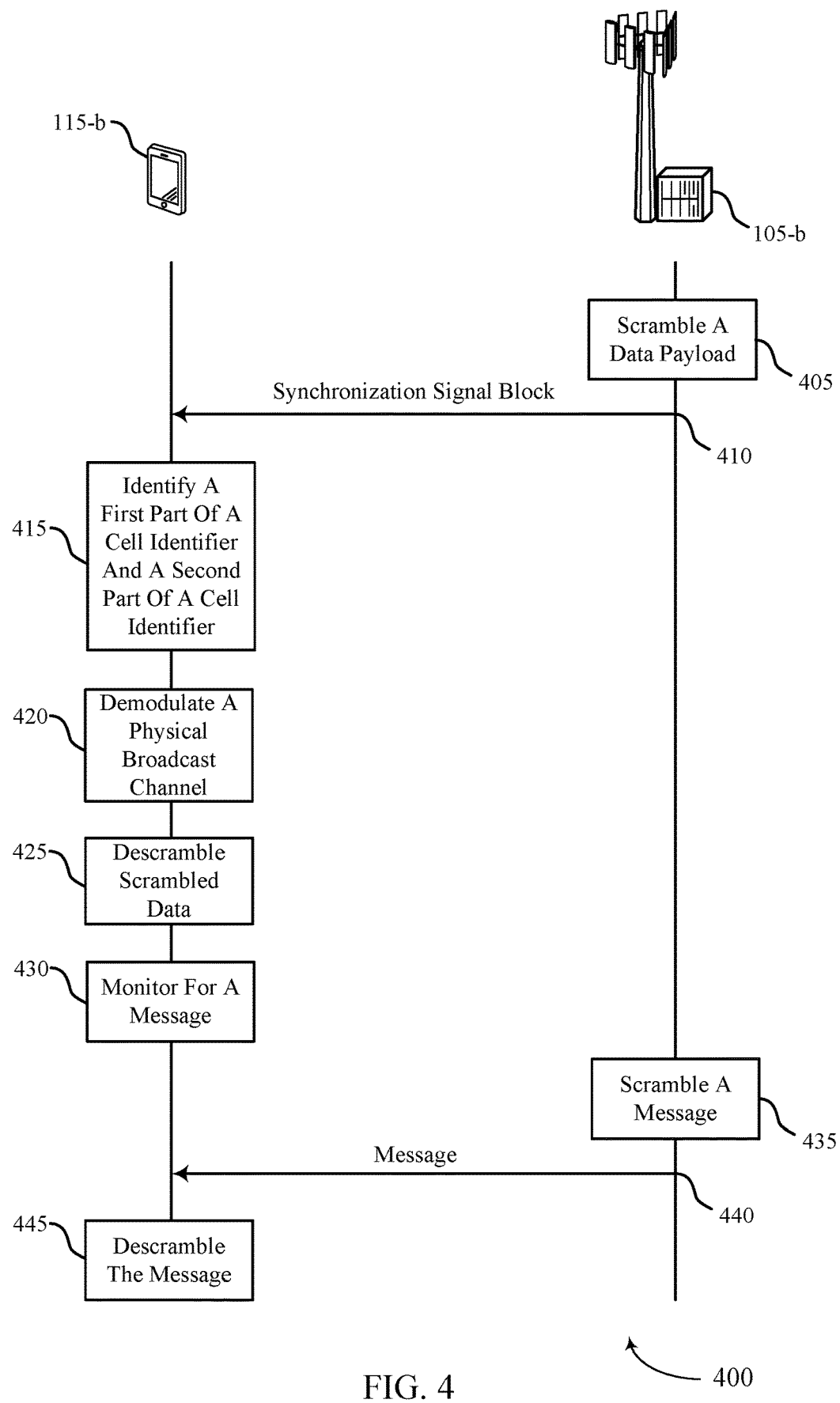
FIG. 4 illustrates an example of a process flow that supports scrambling initialization indication for higher bands in accordance with aspects of the present disclosure.

FIG. 4 illustrates an example of a process flow 400 that supports scrambling initialization indication for higher bands in accordance with aspects of the present disclosure. In some examples, the process flow 400 may implement aspects of the wireless communications system 100 or the wireless communications system 200. For example, the process flow 400 illustrates signaling between a UE 115-b and a base station 105-b (which may be examples of the corresponding devices described herein, including with reference to FIGS. 1 and 2), where the base station 105-b may transmit one or more SSBs to the UE 115-b. In some examples, the base station 105-b may transmit such SSBs without an SSS field, including information otherwise signaled with the SSS, with a PSS, a PBCH, a DMRS, or a combination thereof.

In the following description of the process flow 400, the operations may be performed (e.g., reported or provided) in a different order than the order shown, or the operations performed by the UE 115-b and the base station 105-b may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

At 405, the base station 105-b may scramble at least a portion of a data payload that the base station 105-b may transmit to the UE 115-b, for example, within an SSB. The data payload may include an MIB such as the MIB in Table 1, PBCH multiplexed bits in L1 such as the PBCH multiplexed bits in L1 in Table 2, among other information to be signaled to the UE 115-b. For example, the base station 105-b may scramble at least a portion of the data payload of a PBCH (e.g., of an SSB) using a sequence initialized by a first part of a cell ID, a second part of a cell ID, or both. Additionally or alternatively, the base station 105-b may scramble at least a portion of the data payload of the PBCH using a sequence initialized by an index of an SSB. For example, the base station 105-b may scramble the portion of the data payload using a sequence initialized by an SSB index or a beam index (e.g., a beam used to transmit an SSB including the data payload).

At 410, the base station 105-b may transmit, and the UE 115-b may receive, an SSB, such as the SSB with the scrambled data payload at 405, where the SSB may include a PSS, a data payload, and a DMRS. That is, the base station 105-b may transmit the SSB without an SSS and may transmit the SSB including information, otherwise transmitted with the SSS, with the PSS, the data payload, or the DMRS. For example, the base station 105-b may transmit the SSB, indicating the first part of the cell ID with the PSS, the data payload, the DMRS, or a combination thereof. In some examples, the base station 105-b may transmit, and the UE 115-b may receive, the SSB including an MIB in the data payload, where the MIB includes at least one of the first part of the cell ID, the second part of the cell ID, or both. For example, the MIB may include a field for the first part of the cell ID, the second part of the cell ID, or both, within a set of stored values, such as a table of stored values as described with reference to FIG. 2. In some examples, the base station 105-b may transmit, and the UE 115-b may receive the SSB including one or more PBCH bits of the data payload multiplexed in a physical layer (e.g., L1), where the PBCH bits indicate the first part of the cell ID, the second part of the cell ID, or both. For example, the PBCH bits may include a field for the first part of the cell ID, the second part of the cell ID, or both, within a set of stored values, such as a table of stored values as described with reference to FIG. 2. In some examples, the base station 105-*b* may transmit, and the UE 115-*b* may receive, the SSB including the PSS that may be generated using a sequence indicating the first part of the cell ID and the second part of the cell ID. For example, to receive the SSB, the UE 115-*b* may perform an initial cell search, where the UE 115-*b* may search for the PSS, and perform at least a correlation technique to determine the sequence, and thus, the first part of the cell ID and the second part of the cell ID. In some cases, the base station 105-*b* may transmit, and the UE 115-*b* may receive, the SSB including the DMRS where the first part of the cell ID, the second part of the cell ID, or both are indicated in a sequence of the DMRS. For example, the data payload may include interleaved DMRSs, where the UE 115-*b* may receive the DMRSs, determine a sequence of the DMRSs (e.g., indicated in control signaling, autonomous determination at the UE 115-*b*, predefined values at the UE 115-*b*) where the sequence of the DMRSs may indicate the first part of the cell ID, the second part of the cell ID, or both.

At 415, the UE 115-*b* may identify the first part and the second part of the cell ID of the base station 105-*b* based on the first part or the second part of the cell ID being indicated in a sequence of the DMRS, indicated in the data payload, or both. Additionally or alternatively, the UE 115-*b* may identify the first part of the cell ID, the second part of the cell ID, or both using the PSS, for example, identifying that the PSS sequence indicates the first part of the cell ID, the second part of the cell ID, or both.

In some examples, the base station 105-*b* may transmit, and the UE 115-*b* may receive the data payload via a PBCH of the SSB. In such cases, at 420, the UE 115-*b* may demodulate the PBCH to obtain scrambled data based at least in part on the sequence of the DMRS interleaved in the subcarriers of the PBCH. In some examples, the UE 115-*b* may demodulate the PBCH of the SSB based at least in part on the sequence of the DMRS being initialized by the second part of the cell ID. Additionally or alternatively, the UE 115-*b* may demodulate the PBCH of the SSB based at least in part on the sequence of the DMRS being initialized by an index of the SSB. For example, the sequence of the DMRS may be initialized by an SSB index or an index of a beam used to transmit the SSB.

At 425, the UE 115-*b* may descramble scrambled data, in the SSB, to obtain at least a portion of the data payload based at least in part on a second sequence of the PBCH. For example, the UE 115-*b* may descramble the scrambled data based at least in part on the sequence of the PBCH being initialized by the first part of the cell ID, the second part of the cell ID, or both. Additionally or alternatively, the UE 115-*b* may descramble the scrambled data based at least in part on the sequence of the PBCH being initialized by the index of the SSB (e.g., the SSB index, a beam index).

At 430, the UE 115-*b* may monitor for a message from the base station 105-based at least in part on the cell ID, for example, based on the first part of the cell ID, the second part of the cell ID, or both.

At 435, the base station 105-*b* may scramble at least a portion of the message based at least in part on (e.g., using) the first part of the cell ID, the second part of the cell ID, or both. Scrambling using the cell ID of the base station 105-*b* may permit the UE 115-*b* to know that the message was transmitted by base station 105-*b*, instead of a different base station. As such, at 440, the base station 105-*b* may transmit, and the UE 115-*b* may receive the message, where at least a portion of the message is generated based on the first part of the cell ID, the second part of the cell ID, or both.

At 445, the UE 115-*b* may descramble the portion of the message using the first part of the cell ID, the second part of the cell ID, or both.

Configuring devices to indicate the first part of the cell ID according to the methods described herein (e.g., when refraining from transmitting the SSS) may eliminating UE searching procedures for the SSS, reducing UE complexity, while indicating the first part of the cell ID in a different portion of the SSB, retaining a number of potential cell ID values thereby maintaining robust channel scrambling (e.g., using the cell ID).

Figure 5:
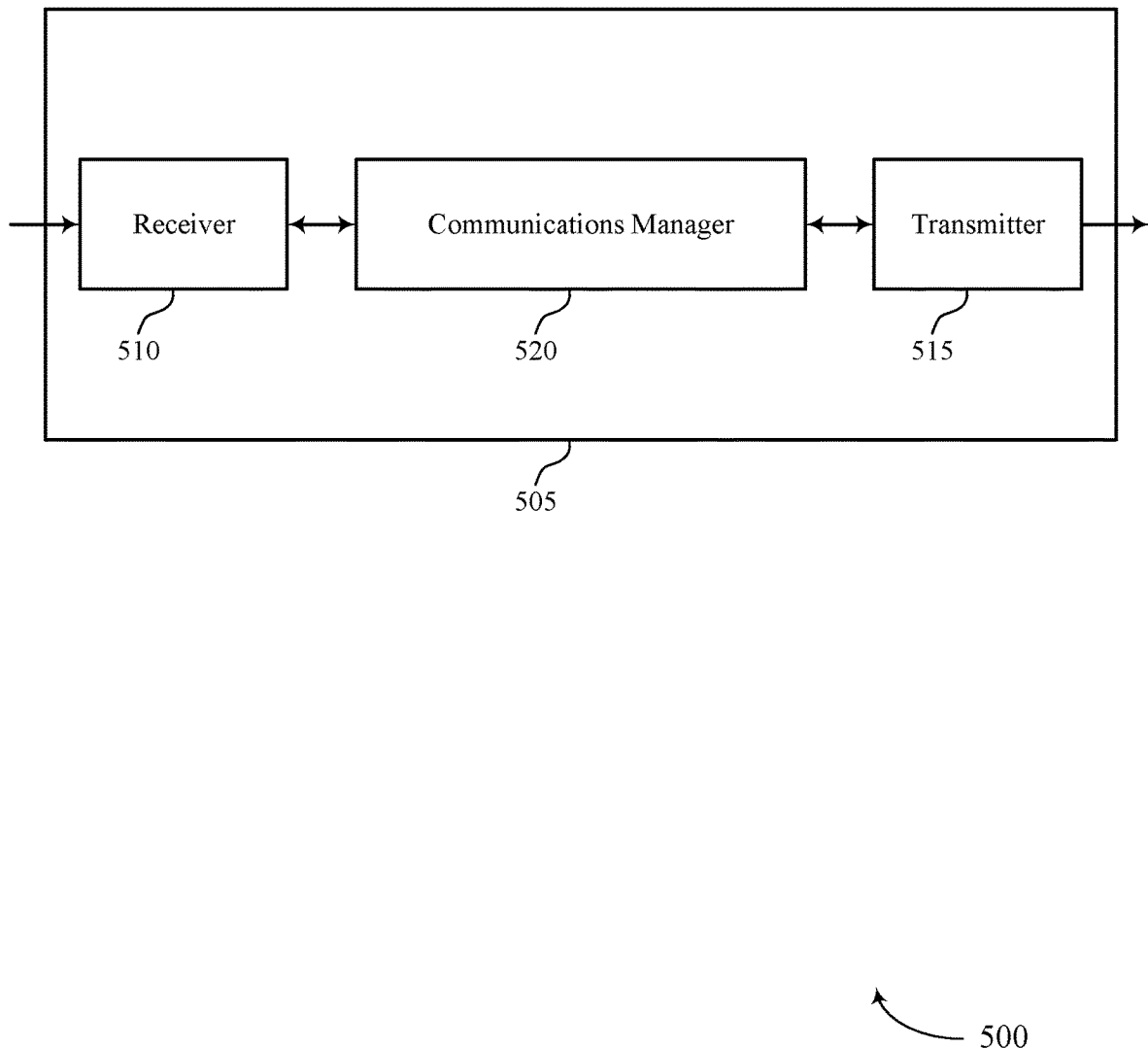
FIGS. 5 and 6 show block diagrams of devices that support scrambling initialization indication for higher bands in accordance with aspects of the present disclosure.

FIG. 5 shows a block diagram 500 of a device 505 that supports scrambling initialization indication for higher bands in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to scrambling initialization indication for higher bands). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to scrambling initialization indication for higher bands). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of scrambling initialization indication for higher bands as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a SSB from a base station, the SSB including a PSS, a data payload, and a DMRS. The communications manager 520 may be configured as or otherwise support a means for identifying a first part and a second part of a cell ID of the base station based on at least one of the first part or the second part of the cell ID being indicated in a sequence of the DMRS, or indicated in the data payload, or both. The communications manager 520 may be configured as or otherwise support a means for monitoring for a message from the base station based on the cell ID.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for receiving an SSB from a base station, the SSB indicating a first part of a cell ID in the SSB with a PSS, a data payload, and a DMRS, eliminating searching procedures for SSS, reducing processing complexity, increasing communication efficiency, among other processing improvements.

Figure 6:
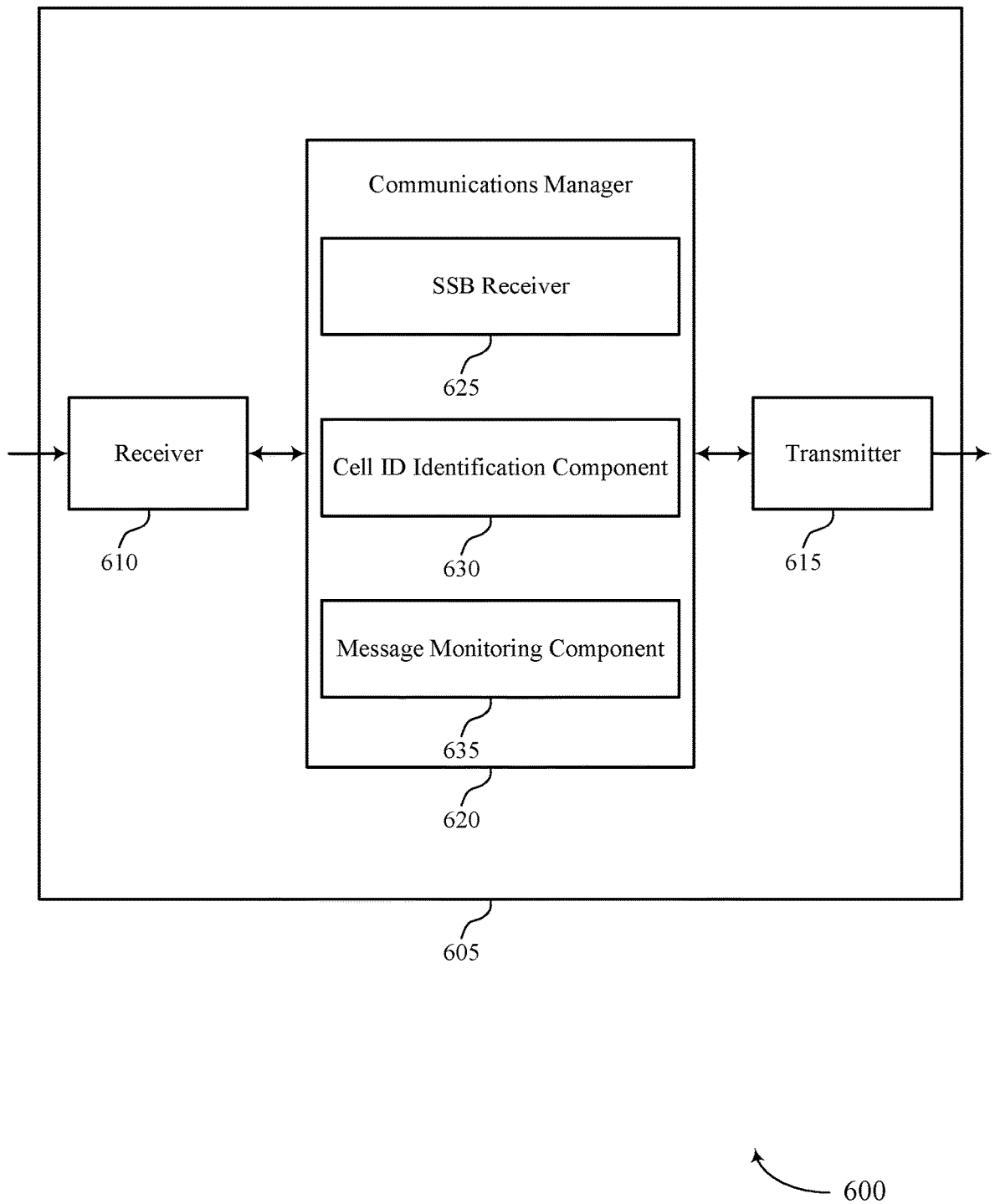

FIG. 6 shows a block diagram 600 of a device 605 that supports scrambling initialization indication for higher bands in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scrambling initialization indication for higher bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scrambling initialization indication for higher bands). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of scrambling initialization indication for higher bands as described herein. For example, the communications manager 620 may include an SSB receiver 625, a cell ID identification component 630, a message monitoring component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SSB receiver 625 may be configured as or otherwise support a means for receiving a SSB from a base station, the SSB including a PSS, a data payload, and a DMRS. The cell ID identification component 630 may be configured as or otherwise support a means for identifying a first part and a second part of a cell ID of the base station based on at least one of the first part or the second part of the cell ID being indicated in a sequence of the DMRS, or indicated in the data payload, or both. The message monitoring component 635 may be configured as or otherwise support a means for monitoring for a message from the base station based on the cell ID.

Figure 7:
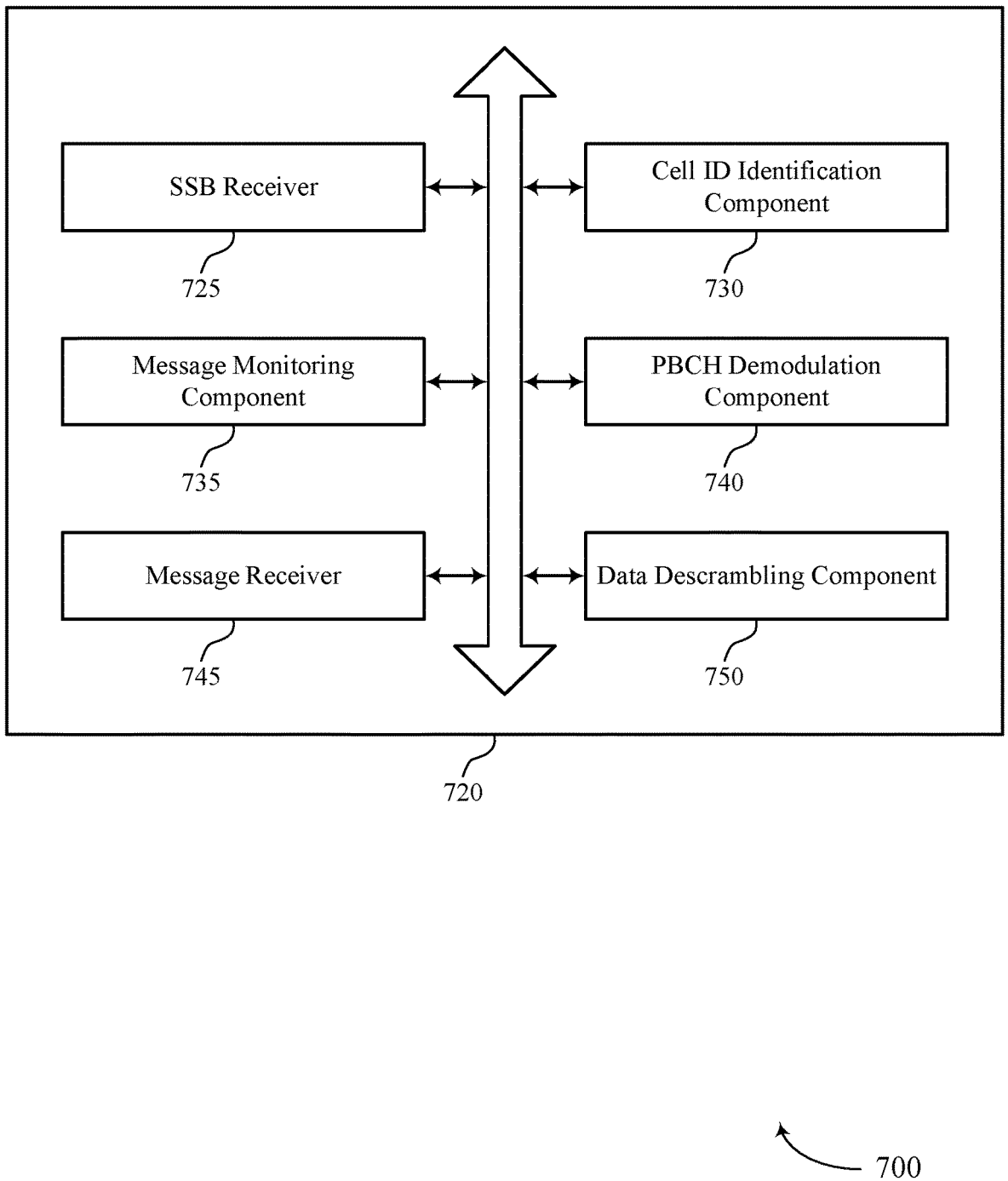
FIG. 7 shows a block diagram of a communications manager that supports scrambling initialization indication for higher bands in accordance with aspects of the present disclosure.

FIG. 7 shows a block diagram 700 of a communications manager 720 that supports scrambling initialization indication for higher bands in accordance with aspects of the present disclosure. The communications manager 720 may be an example of aspects of a communications manager 520, a communications manager 620, or both, as described herein. The communications manager 720, or various components thereof, may be an example of means for performing various aspects of scrambling initialization indication for higher bands as described herein. For example, the communications manager 720 may include an SSB receiver 725, a cell ID identification component 730, a message monitoring component 735, a PBCH demodulation component 740, a message receiver 745, a data descrambling component 750, or any combination thereof. Each of these components may communicate, directly or indirectly, with one another (e.g., via one or more buses).

The communications manager 720 may support wireless communication at a UE in accordance with examples as disclosed herein. The SSB receiver 725 may be configured as or otherwise support a means for receiving a SSB from a base station, the SSB including a PSS, a data payload, and a DMRS. The cell ID identification component 730 may be configured as or otherwise support a means for identifying a first part and a second part of a cell ID of the base station based on at least one of the first part or the second part of the cell ID being indicated in a sequence of the DMRS, or indicated in the data payload, or both. The message monitoring component 735 may be configured as or otherwise support a means for monitoring for a message from the base station based on the cell ID.

In some examples, to support receiving the SSB, the SSB receiver 725 may be configured as or otherwise support a means for receiving the SSB including a MIB in the data payload, where the MIB includes at least one of the first part of the cell ID, the second part of the cell ID, or both.

In some examples, to support receiving the SSB, the SSB receiver 725 may be configured as or otherwise support a means for receiving the SSB including one or more PBCH bits of the data payload multiplexed in a physical layer, where the PBCH bits indicate at least one of the first part of the cell ID, the second part of the cell ID, or both.

In some examples, to support receiving the SSB, the SSB receiver 725 may be configured as or otherwise support a means for receiving the SSB including the PSS that is generated using a sequence indicating the first part of the cell ID and the second part of the cell ID.

In some examples, to support receiving the SSB, the SSB receiver 725 may be configured as or otherwise support a means for receiving the data payload via a PBCH of the SSB.

In some examples, the PBCH demodulation component 740 may be configured as or otherwise support a means for demodulating the PBCH to obtain scrambled data based on the sequence of the DMRS. In some examples, the data descrambling component 750 may be configured as or otherwise support a means for descrambling the scrambled data to obtain at least a portion of the data payload based on a second sequence initialized by the first part of the cell ID, the second part of the cell ID, or both.

In some examples, the PBCH demodulation component 740 may be configured as or otherwise support a means for demodulating the PBCH to obtain scrambled data based on the sequence of the DMRS. In some examples, the data descrambling component 750 may be configured as or otherwise support a means for descrambling the scrambled data to obtain at least a portion of the data payload based on a second sequence initialized by an index of the SSB.

In some examples, the PBCH demodulation component 740 may be configured as or otherwise support a means for demodulating a PBCH of the SSB based on the sequence of the DMRS being initialized by the second part of the cell ID.

In some examples, the PBCH demodulation component 740 may be configured as or otherwise support a means for demodulating a PBCH of the SSB based on the sequence of the DMRS being initialized by an index of the SSB.

In some examples, the message receiver 745 may be configured as or otherwise support a means for receiving the message from the base station, where at least a portion of the message is generated based on the first part of the cell ID, the second part of the cell ID, or both.

In some examples, the data descrambling component 750 may be configured as or otherwise support a means for descrambling the portion of the message using the first part of the cell ID, the second part of the cell ID, or both.

Figure 8:
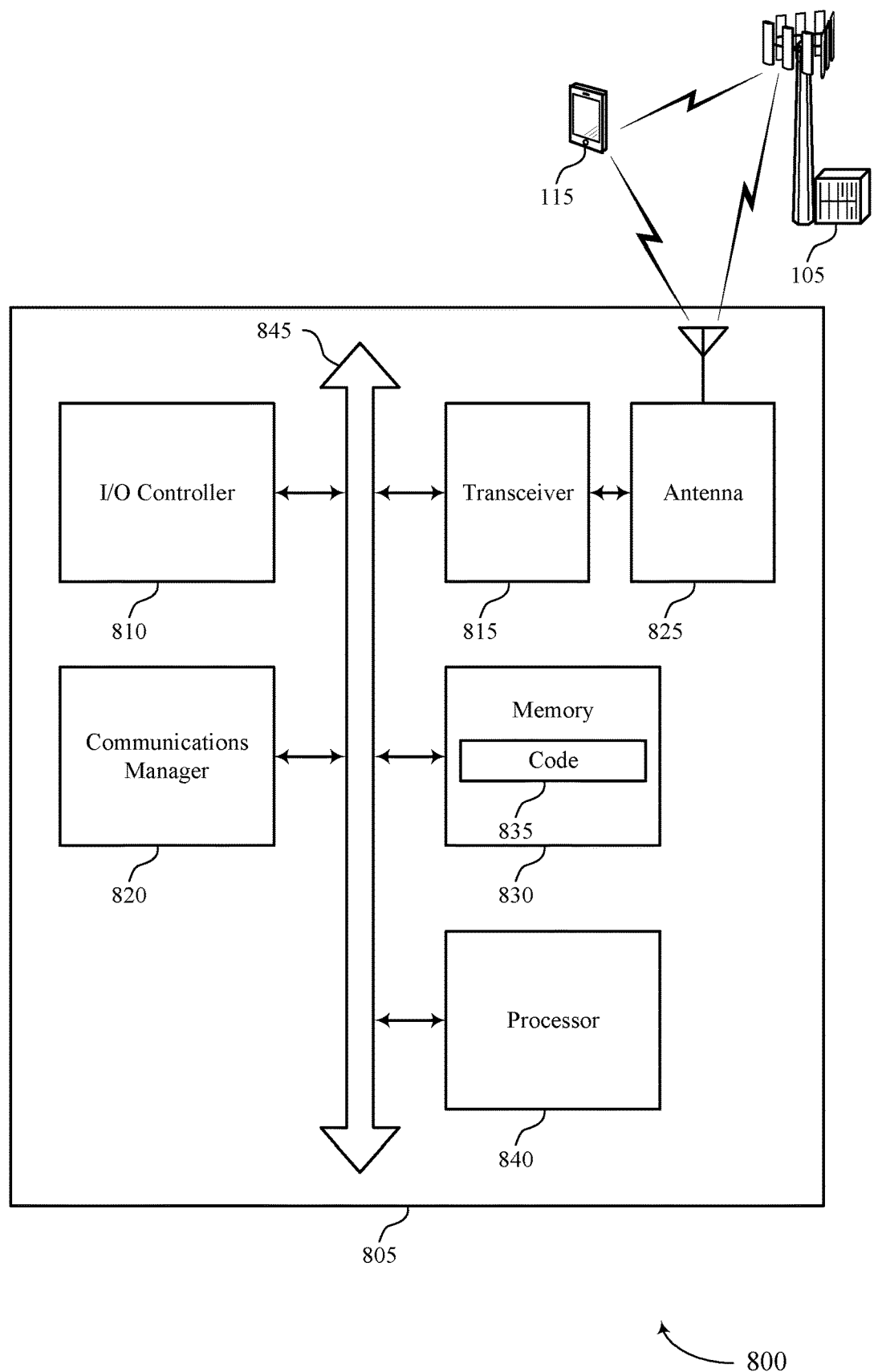
FIG. 8 shows a diagram of a system including a device that supports scrambling initialization indication for higher bands in accordance with aspects of the present disclosure.

FIG. 8 shows a diagram of a system 800 including a device 805 that supports scrambling initialization indication for higher bands in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting scrambling initialization indication for higher bands). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a SSB from a base station, the SSB including a PSS, a data payload, and a DMRS. The communications manager 820 may be configured as or otherwise support a means for identifying a first part and a second part of a cell ID of the base station based on at least one of the first part or the second part of the cell ID being indicated in a sequence of the DMRS, or indicated in the data payload, or both. The communications manager 820 may be configured as or otherwise support a means for monitoring for a message from the base station based on the cell ID.

By including or configuring the communications manager 820 in accordance with examples as described herein, the device 805 may support techniques for receiving an SSB from a base station, the SSB indicating a first part of a cell ID in the SSB with a PSS, a data payload, and a DMRS, eliminating searching procedures for SSS, improving utilization of communication resources, coordination between devices, utilization of processing capability, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of scrambling initialization indication for higher bands as described herein, or the processor 840 and the memory 830 may be otherwise configured to perform or support such operations.

Figure 9:
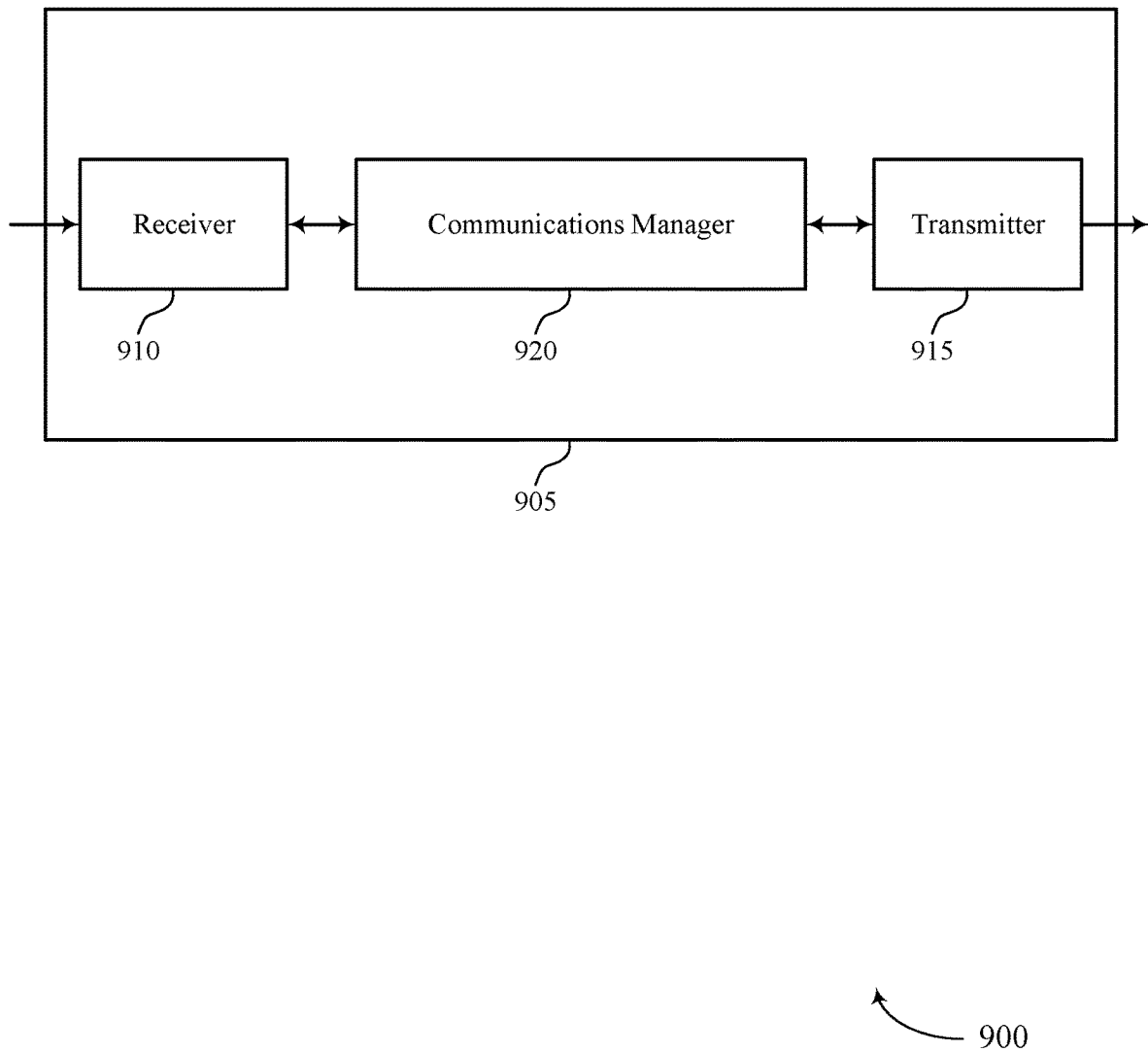
FIGS. 9 and 10 show block diagrams of devices that support scrambling initialization indication for higher bands in accordance with aspects of the present disclosure.

FIG. 9 shows a block diagram 900 of a device 905 that supports scrambling initialization indication for higher bands in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to scrambling initialization indication for higher bands). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to scrambling initialization indication for higher bands). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of scrambling initialization indication for higher bands as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting a SSB to a UE, the SSB including a PSS, a data payload, and a DMRS, where at least one of a first part or a second part of a cell ID of the base station is indicated in a sequence of the DMRS, indicated in the data payload, or both. The communications manager 920 may be configured as or otherwise support a means for transmitting, to the UE, a message that is generated based on the first part of the cell ID, the second part of the cell ID, or both.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for transmitting an SSB to a UE, the SSB indicating a first part of a cell ID in the SSB with a PSS, a data payload, and a DMRS, eliminating searching procedures for SSS, reducing processing complexity, increasing communication efficiency, among other processing improvements.

Figure 10:
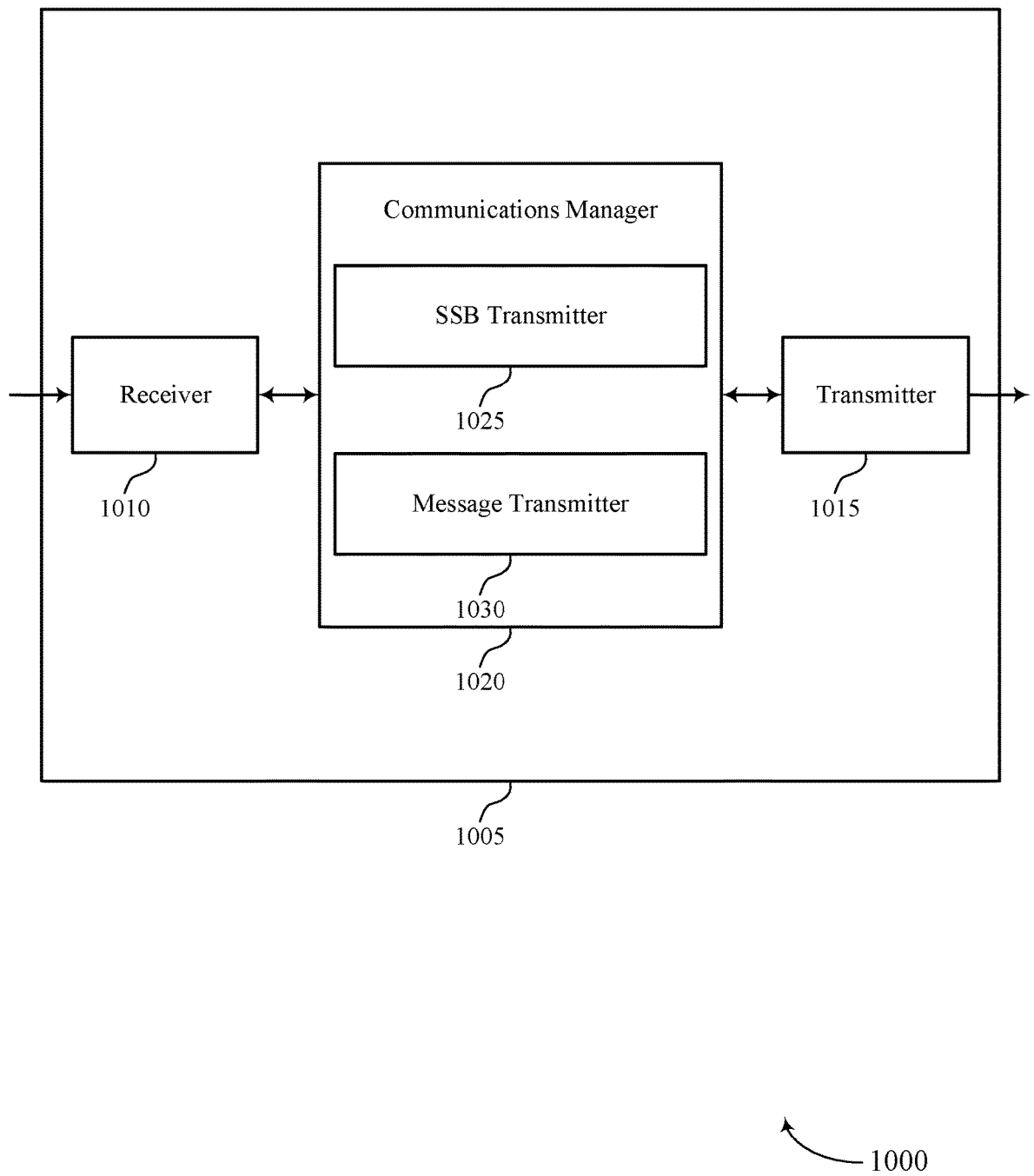

FIG. 10 shows a block diagram 1000 of a device 1005 that supports scrambling initialization indication for higher bands in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to scrambling initialization indication for higher bands). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to scrambling initialization indication for higher bands). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of scrambling initialization indication for higher bands as described herein. For example, the communications manager 1020 may include an SSB transmitter 1025 a message transmitter 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The SSB transmitter 1025 may be configured as or otherwise support a means for transmitting a SSB to a UE, the SSB including a PSS, a data payload, and a DMRS, where at least one of a first part or a second part of a cell ID of the base station is indicated in a sequence of the DMRS, indicated in the data payload, or both. The message transmitter 1030 may be configured as or otherwise support a means for transmitting, to the UE, a message that is generated based on the first part of the cell ID, the second part of the cell ID, or both.

Figure 11:
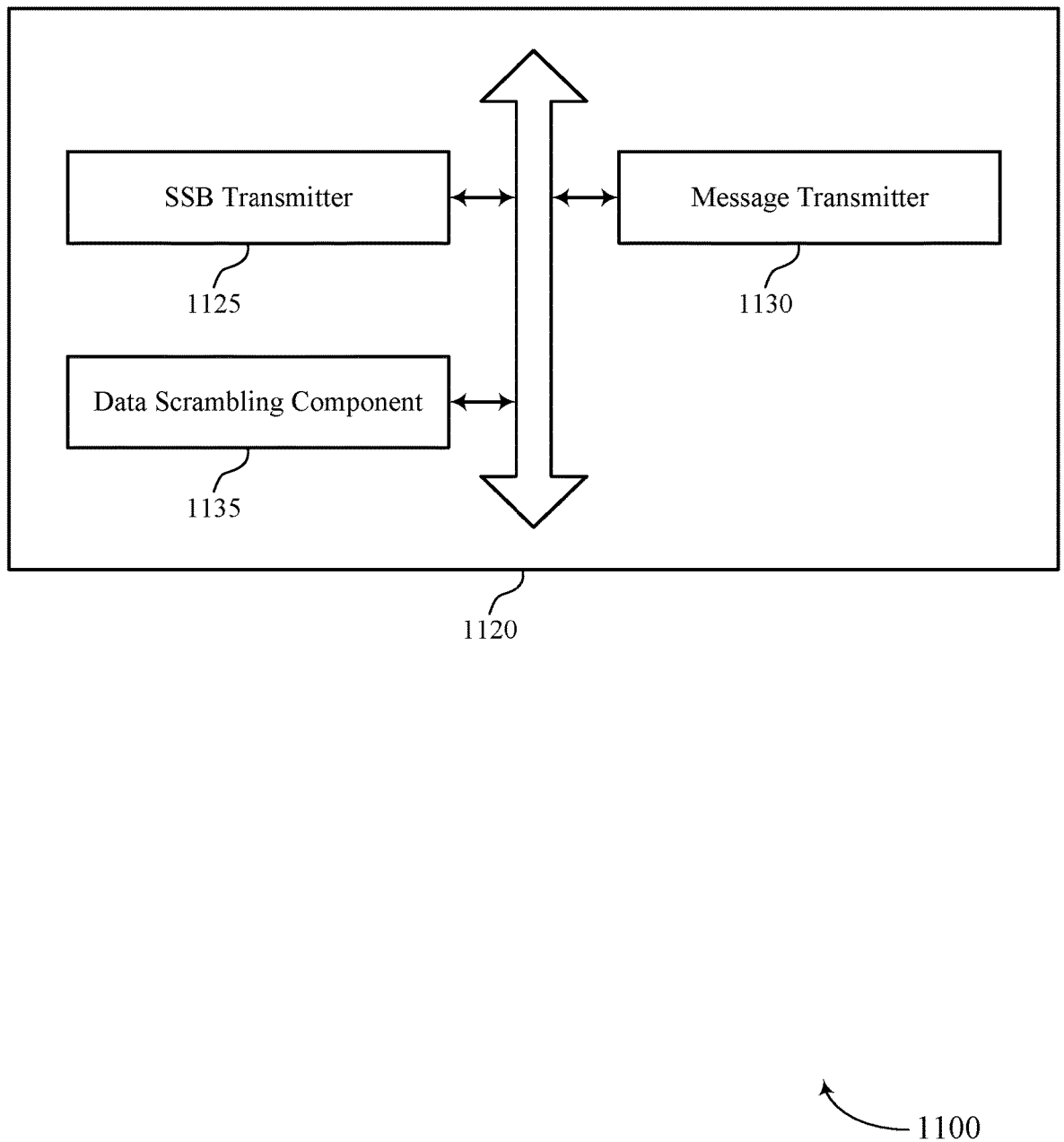
FIG. 11 shows a block diagram of a communications manager that supports scrambling initialization indication for higher bands in accordance with aspects of the present disclosure.

FIG. 11 shows a block diagram 1100 of a communications manager 1120 that supports scrambling initialization indication for higher bands in accordance with aspects of the present disclosure. The communications manager 1120 may be an example of aspects of a communications manager 920, a communications manager 1020, or both, as described herein. The communications manager 1120, or various components thereof, may be an example of means for performing various aspects of scrambling initialization indication for higher bands as described herein. For example, the communications manager 1120 may include an SSB transmitter 1125, a message transmitter 1130, a data scrambling component 1135, or any combination thereof. Each of these components may communicate, directly or indirectly, with one another (e.g., via one or more buses).

The communications manager 1120 may support wireless communication at a base station in accordance with examples as disclosed herein. The SSB transmitter 1125 may be configured as or otherwise support a means for transmitting a SSB to a UE, the SSB including a PSS, a data payload, and a DMRS, where at least one of a first part or a second part of a cell ID of the base station is indicated in a sequence of the DMRS, indicated in the data payload, or both. The message transmitter 1130 may be configured as or otherwise support a means for transmitting, to the UE, a message that is generated based on the first part of the cell ID, the second part of the cell ID, or both.

In some examples, to support transmitting the SSB, the SSB transmitter 1125 may be configured as or otherwise support a means for transmitting the SSB including an indication of the first part of the cell ID, or the second part of the cell ID, or both, within a MIB of the data payload.

In some examples, to support transmitting the SSB, the SSB transmitter 1125 may be configured as or otherwise support a means for transmitting the SSB including an indication of the first part, or the second part, or both, of the cell ID within PBCH bits of the data payload multiplexed at a physical layer.

In some examples, to support transmitting the SSB, the SSB transmitter 1125 may be configured as or otherwise support a means for transmitting the SSB including an indication of the first part and the second part of the cell ID in a sequence of the PSS.

In some examples, to support transmitting the SSB, the SSB transmitter 1125 may be configured as or otherwise support a means for transmitting the data payload via a PBCH.

In some examples, the data scrambling component 1135 may be configured as or otherwise support a means for scrambling at least a portion of the data payload of the PBCH using a sequence initialized by the first part of the cell ID, the second part of the cell ID, or both.

In some examples, the data scrambling component 1135 may be configured as or otherwise support a means for scrambling at least a portion of the data payload of the PBCH using a sequence initialized by an index of the SSB.

In some examples, to support transmitting the SSB, the SSB transmitter 1125 may be configured as or otherwise support a means for transmitting the DMRS that is generated based on the sequence of the DMRS being initialized by the second part of the cell ID.

In some examples, to support transmitting the SSB, the SSB transmitter 1125 may be configured as or otherwise support a means for transmitting the DMRS that is generated based on the sequence of the DMRS being initialized by an index of the SSB.

In some examples, to support transmitting the message, the data scrambling component 1135 may be configured as or otherwise support a means for scrambling at least a portion of the message based on the first part of the cell ID, the second part of the cell ID, or both.

Figure 12:
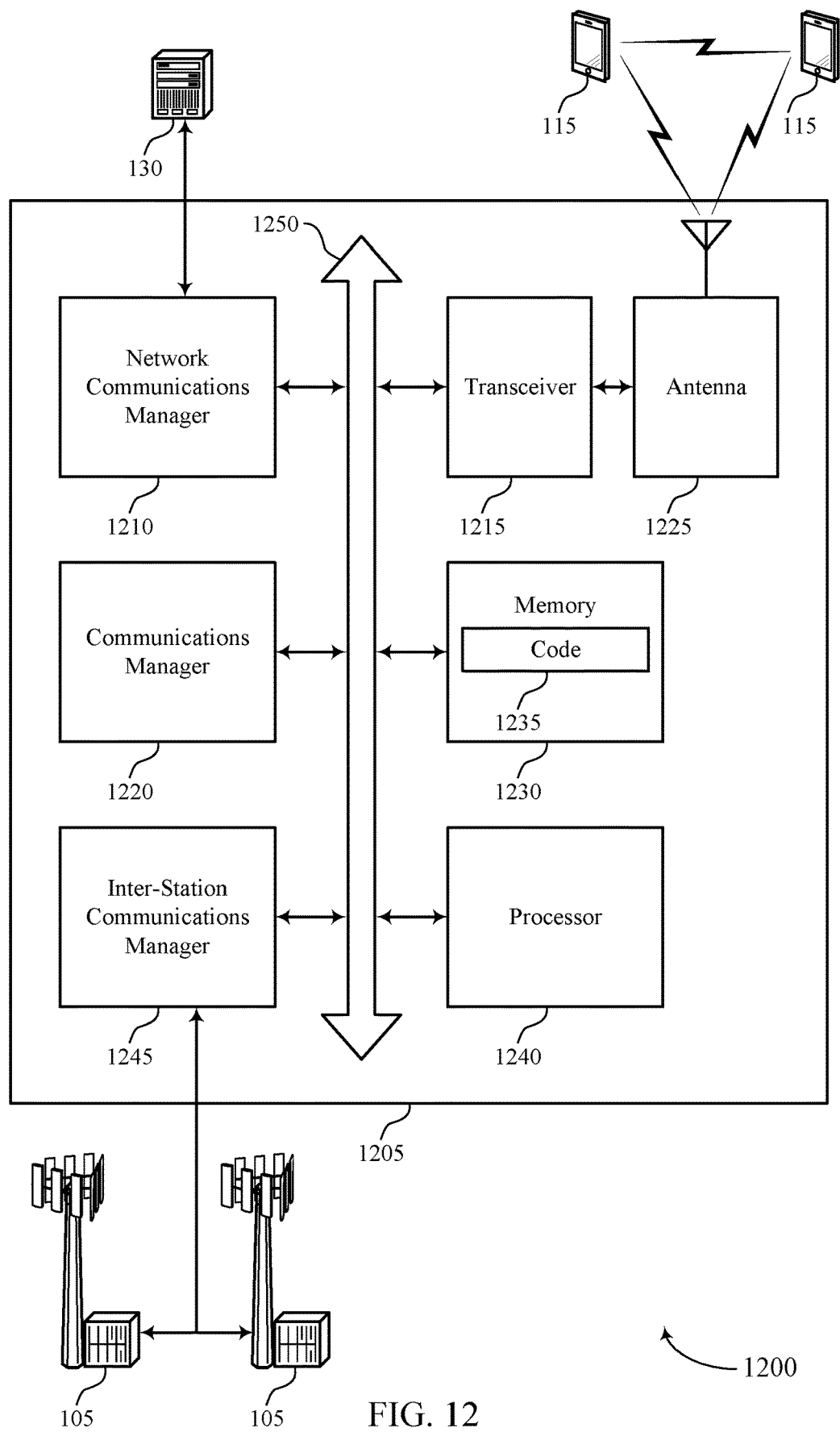
FIG. 12 shows a diagram of a system including a device that supports scrambling initialization indication for higher bands in accordance with aspects of the present disclosure.

FIG. 12 shows a diagram of a system 1200 including a device 1205 that supports scrambling initialization indication for higher bands in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting scrambling initialization indication for higher bands). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting a SSB to a UE, the SSB including a PSS, a data payload, and a DMRS, where at least one of a first part or a second part of a cell ID of the base station is indicated in a sequence of the DMRS, indicated in the data payload, or both. The communications manager 1220 may be configured as or otherwise support a means for transmitting, to the UE, a message that is generated based on the first part of the cell ID, the second part of the cell ID, or both.

By including or configuring the communications manager 1220 in accordance with examples as described herein, the device 1205 may support techniques for transmitting an SSB to a UE, the SSB indicating a first part of a cell ID in the SSB with a PSS, a data payload, and a DMRS, eliminating searching procedures for SSS, improving utilization of communication resources, coordination between devices, utilization of processing capability, among other examples.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of scrambling initialization indication for higher bands as described herein, or the processor 1240 and the memory 1230 may be otherwise configured to perform or support such operations.

Figure 13:
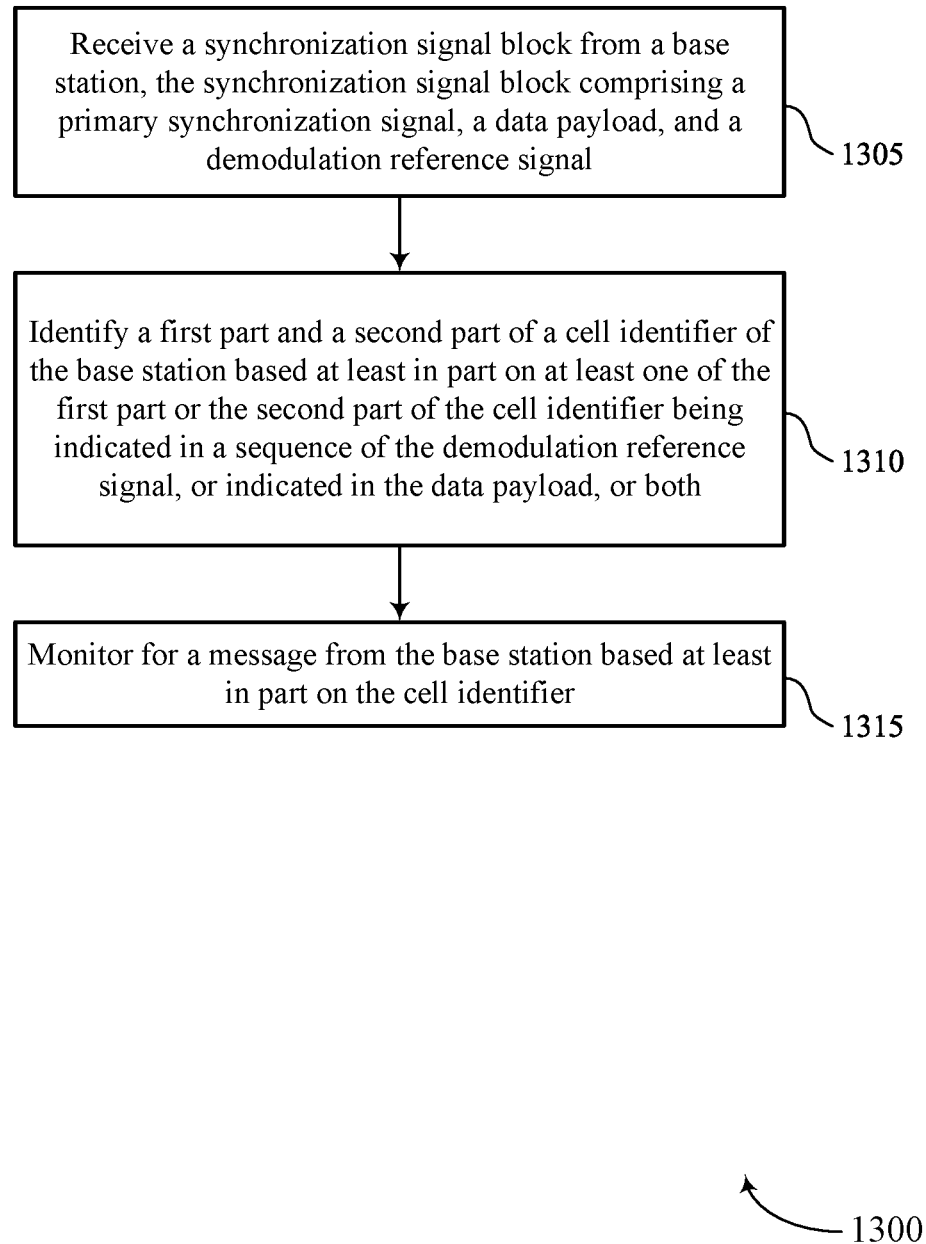
FIGS. 13 through 20 show flowcharts illustrating methods that support scrambling initialization indication for higher bands in accordance with aspects of the present disclosure.

FIG. 13 shows a flowchart illustrating a method 1300 that supports scrambling initialization indication for higher bands in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a SSB from a base station, the SSB including a PSS, a data payload, and a DMRS. The operations of 1305 may be performed in accordance with examples as disclosed herein. In some examples, aspects of the operations of 1305 may be performed by an SSB receiver 725 as described with reference to FIG. 7.

At 1310, the method may include identifying a first part and a second part of a cell ID of the base station based on at least one of the first part or the second part of the cell ID being indicated in a sequence of the DMRS, or indicated in the data payload, or both. The operations of 1310 may be performed in accordance with examples as disclosed herein. In some examples, aspects of the operations of 1310 may be performed by a cell ID identification component 730 as described with reference to FIG. 7.

At 1315, the method may include monitoring for a message from the base station based on the cell ID. The operations of 1315 may be performed in accordance with examples as disclosed herein. In some examples, aspects of the operations of 1315 may be performed by a message monitoring component 735 as described with reference to FIG. 7.

Figure 14:
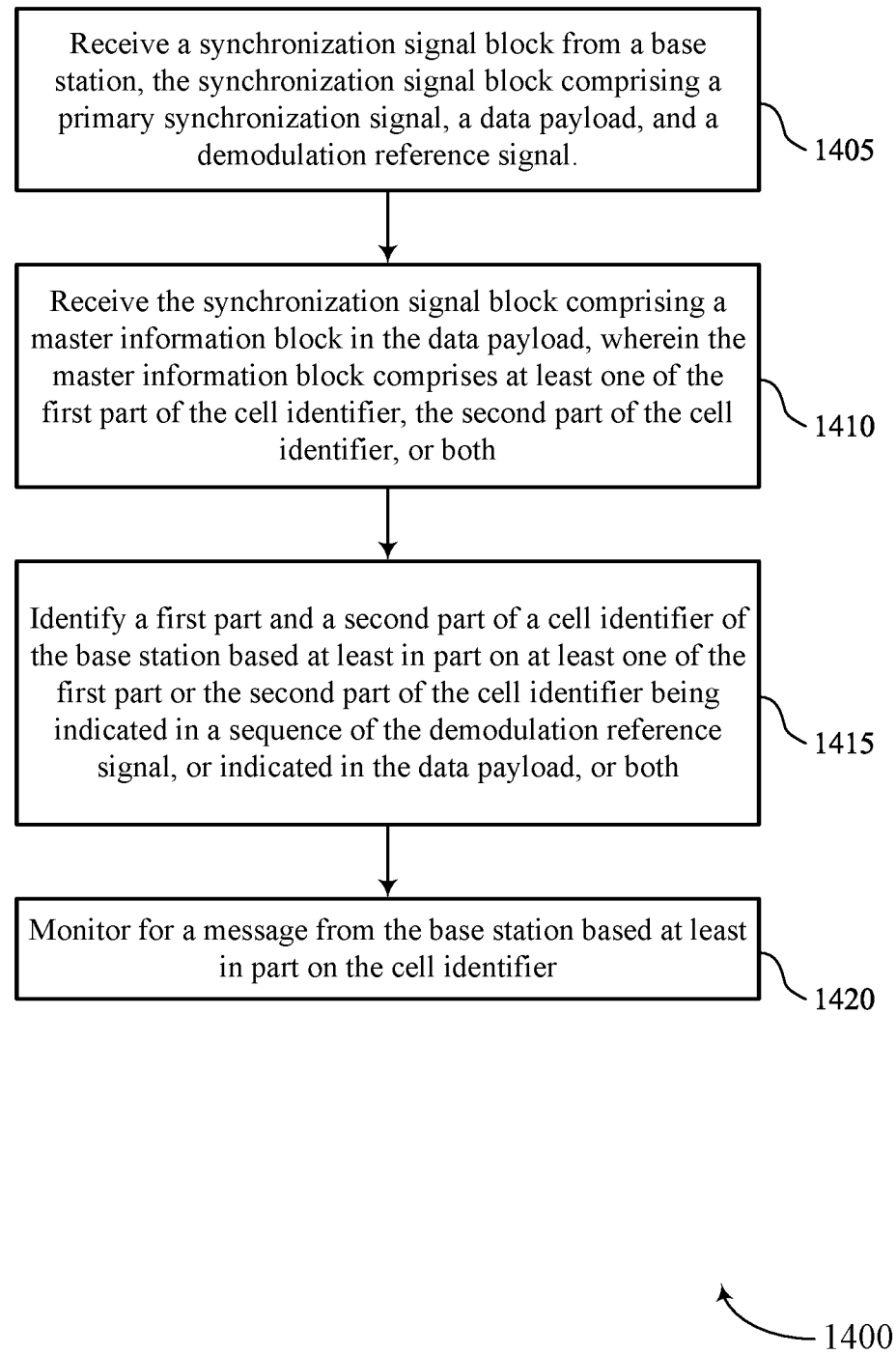

FIG. 14 shows a flowchart illustrating a method 1400 that supports scrambling initialization indication for higher bands in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a SSB from a base station, the SSB including a PSS, a data payload, and a DMRS. The operations of 1405 may be performed in accordance with examples as disclosed herein. In some examples, aspects of the operations of 1405 may be performed by an SSB receiver 725 as described with reference to FIG. 7.

At 1410, the method may include receiving the SSB including a MIB in the data payload, where the MIB includes at least one of the first part of the cell ID, the second part of the cell ID, or both. The operations of 1410 may be performed in accordance with examples as disclosed herein. In some examples, aspects of the operations of 1410 may be performed by an SSB receiver 725 as described with reference to FIG. 7.

At 1415, the method may include identifying a first part and a second part of a cell ID of the base station based on at least one of the first part or the second part of the cell ID being indicated in a sequence of the DMRS, or indicated in the data payload, or both. The operations of 1415 may be performed in accordance with examples as disclosed herein. In some examples, aspects of the operations of 1415 may be performed by a cell ID identification component 730 as described with reference to FIG. 7.

At 1420, the method may include monitoring for a message from the base station based on the cell ID. The operations of 1420 may be performed in accordance with examples as disclosed herein. In some examples, aspects of the operations of 1420 may be performed by a message monitoring component 735 as described with reference to FIG. 7.

Figure 15:
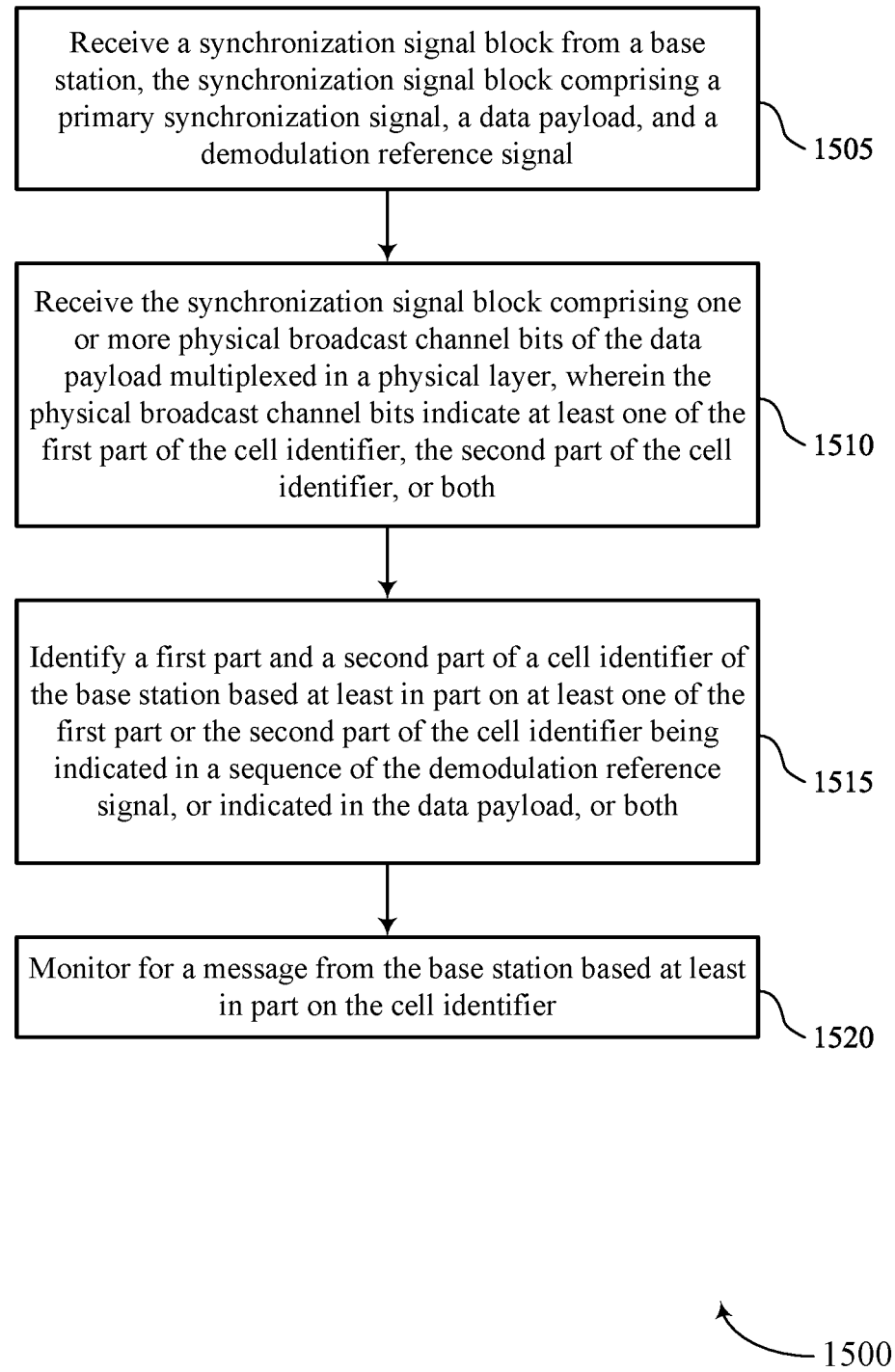

FIG. 15 shows a flowchart illustrating a method 1500 that supports scrambling initialization indication for higher bands in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a SSB from a base station, the SSB including a PSS, a data payload, and a DMRS. The operations of 1505 may be performed in accordance with examples as disclosed herein. In some examples, aspects of the operations of 1505 may be performed by an SSB receiver 725 as described with reference to FIG. 7.

At 1510, the method may include receiving the SSB including one or more PBCH bits of the data payload multiplexed in a physical layer, where the PBCH bits indicate at least one of the first part of the cell ID, the second part of the cell ID, or both. The operations of 1510 may be performed in accordance with examples as disclosed herein. In some examples, aspects of the operations of 1510 may be performed by an SSB receiver 725 as described with reference to FIG. 7.

At 1515, the method may include identifying a first part and a second part of a cell ID of the base station based on at least one of the first part or the second part of the cell ID being indicated in a sequence of the DMRS, or indicated in the data payload, or both. The operations of 1515 may be performed in accordance with examples as disclosed herein. In some examples, aspects of the operations of 1515 may be performed by a cell ID identification component 730 as described with reference to FIG. 7.

At 1520, the method may include monitoring for a message from the base station based on the cell ID. The operations of 1520 may be performed in accordance with examples as disclosed herein. In some examples, aspects of the operations of 1520 may be performed by a message monitoring component 735 as described with reference to FIG. 7.

Figure 16:
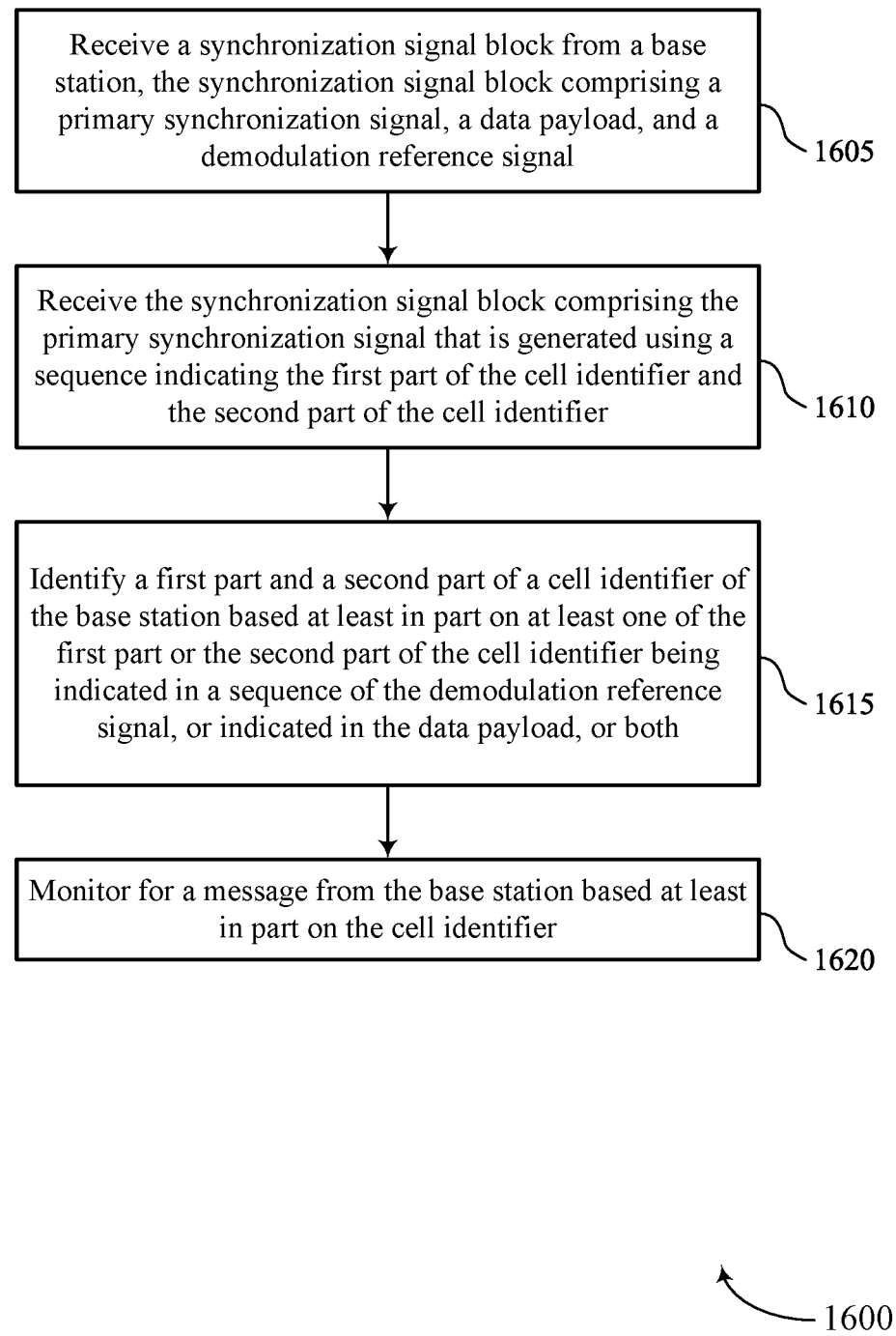

FIG. 16 shows a flowchart illustrating a method 1600 that supports scrambling initialization indication for higher bands in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving a SSB from a base station, the SSB including a PSS, a data payload, and a DMRS. The operations of 1605 may be performed in accordance with examples as disclosed herein. In some examples, aspects of the operations of 1605 may be performed by an SSB receiver 725 as described with reference to FIG. 7.

At 1610, the method may include receiving the SSB including the PSS that is generated using a sequence indicating the first part of the cell ID and the second part of the cell ID. The operations of 1610 may be performed in accordance with examples as disclosed herein. In some examples, aspects of the operations of 1610 may be performed by an SSB receiver 725 as described with reference to FIG. 7.

At 1615, the method may include identifying a first part and a second part of a cell ID of the base station based on at least one of the first part or the second part of the cell ID being indicated in a sequence of the DMRS, or indicated in the data payload, or both. The operations of 1615 may be performed in accordance with examples as disclosed herein. In some examples, aspects of the operations of 1615 may be performed by a cell ID identification component 730 as described with reference to FIG. 7.

At 1620, the method may include monitoring for a message from the base station based on the cell ID. The operations of 1620 may be performed in accordance with examples as disclosed herein. In some examples, aspects of the operations of 1620 may be performed by a message monitoring component 735 as described with reference to FIG. 7.

Figure 17:
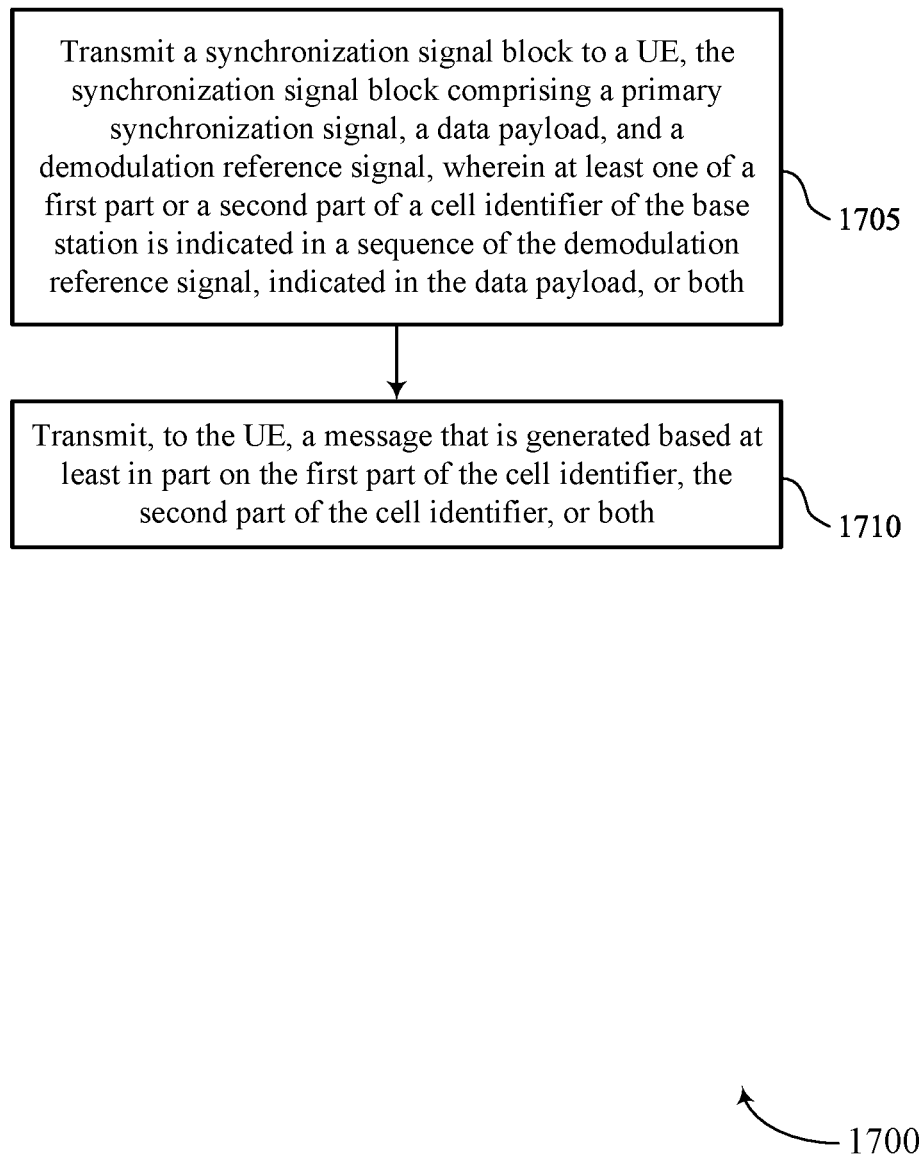

FIG. 17 shows a flowchart illustrating a method 1700 that supports scrambling initialization indication for higher bands in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting a SSB to a UE, the SSB including a PSS, a data payload, and a DMRS, where at least one of a first part or a second part of a cell ID of the base station is indicated in a sequence of the DMRS, indicated in the data payload, or both. The operations of 1705 may be performed in accordance with examples as disclosed herein. In some examples, aspects of the operations of 1705 may be performed by an SSB transmitter 1125 as described with reference to FIG. 11.

At 1710, the method may include transmitting, to the UE, a message that is generated based on the first part of the cell ID, the second part of the cell ID, or both. The operations of 1710 may be performed in accordance with examples as disclosed herein. In some examples, aspects of the operations of 1710 may be performed by a message transmitter 1130 as described with reference to FIG. 11.

Figure 18:
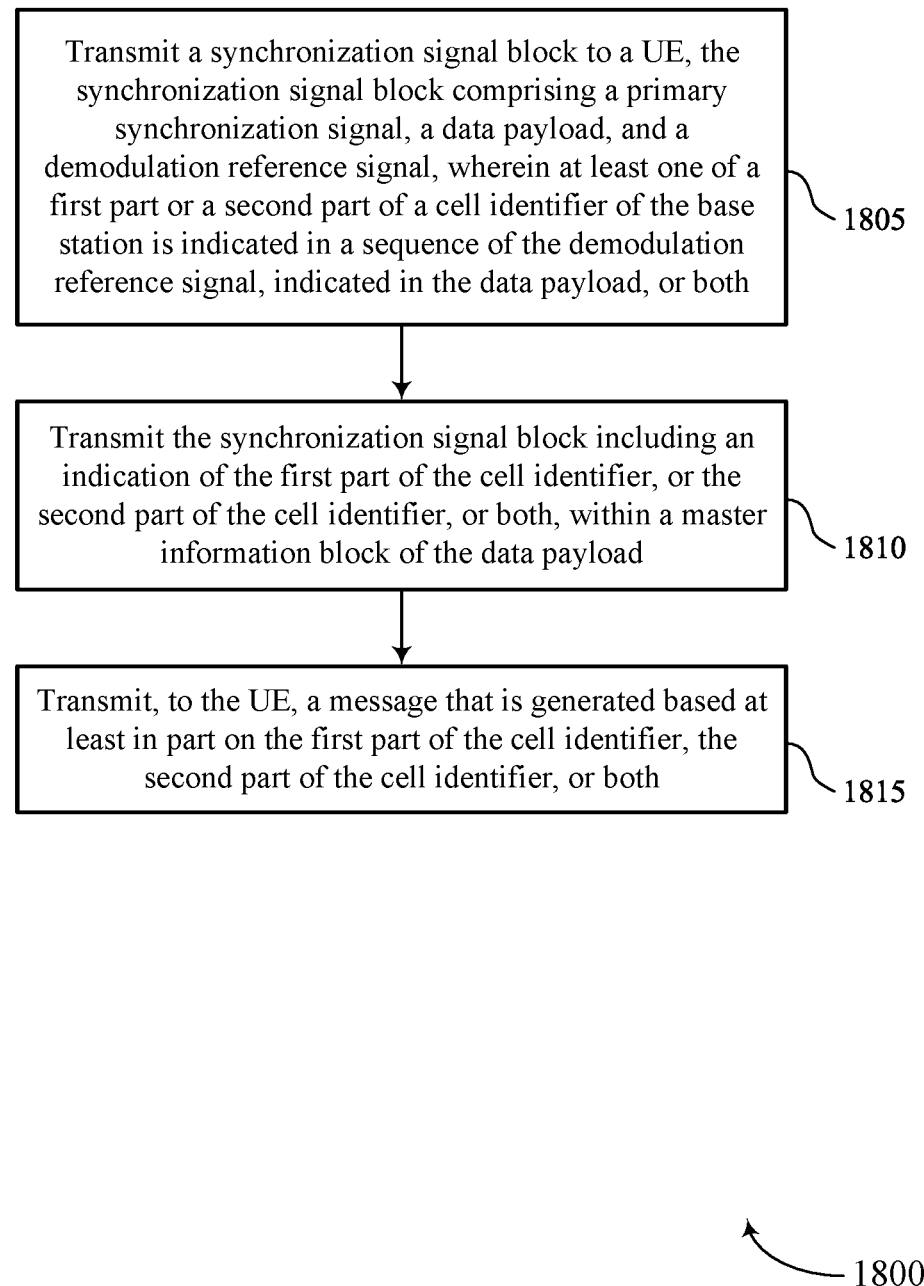

FIG. 18 shows a flowchart illustrating a method 1800 that supports scrambling initialization indication for higher bands in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting a SSB to a UE, the SSB including a PSS, a data payload, and a DMRS, where at least one of a first part or a second part of a cell ID of the base station is indicated in a sequence of the DMRS, indicated in the data payload, or both. The operations of 1805 may be performed in accordance with examples as disclosed herein. In some examples, aspects of the operations of 1805 may be performed by an SSB transmitter 1125 as described with reference to FIG. 11.

At 1810, the method may include transmitting the SSB including an indication of the first part of the cell ID, or the second part of the cell ID, or both, within a MIB of the data payload. The operations of 1810 may be performed in accordance with examples as disclosed herein. In some examples, aspects of the operations of 1810 may be performed by an SSB transmitter 1125 as described with reference to FIG. 11.

At 1815, the method may include transmitting, to the UE, a message that is generated based on the first part of the cell ID, the second part of the cell ID, or both. The operations of 1815 may be performed in accordance with examples as disclosed herein. In some examples, aspects of the operations of 1815 may be performed by a message transmitter 1130 as described with reference to FIG. 11.

Figure 19:
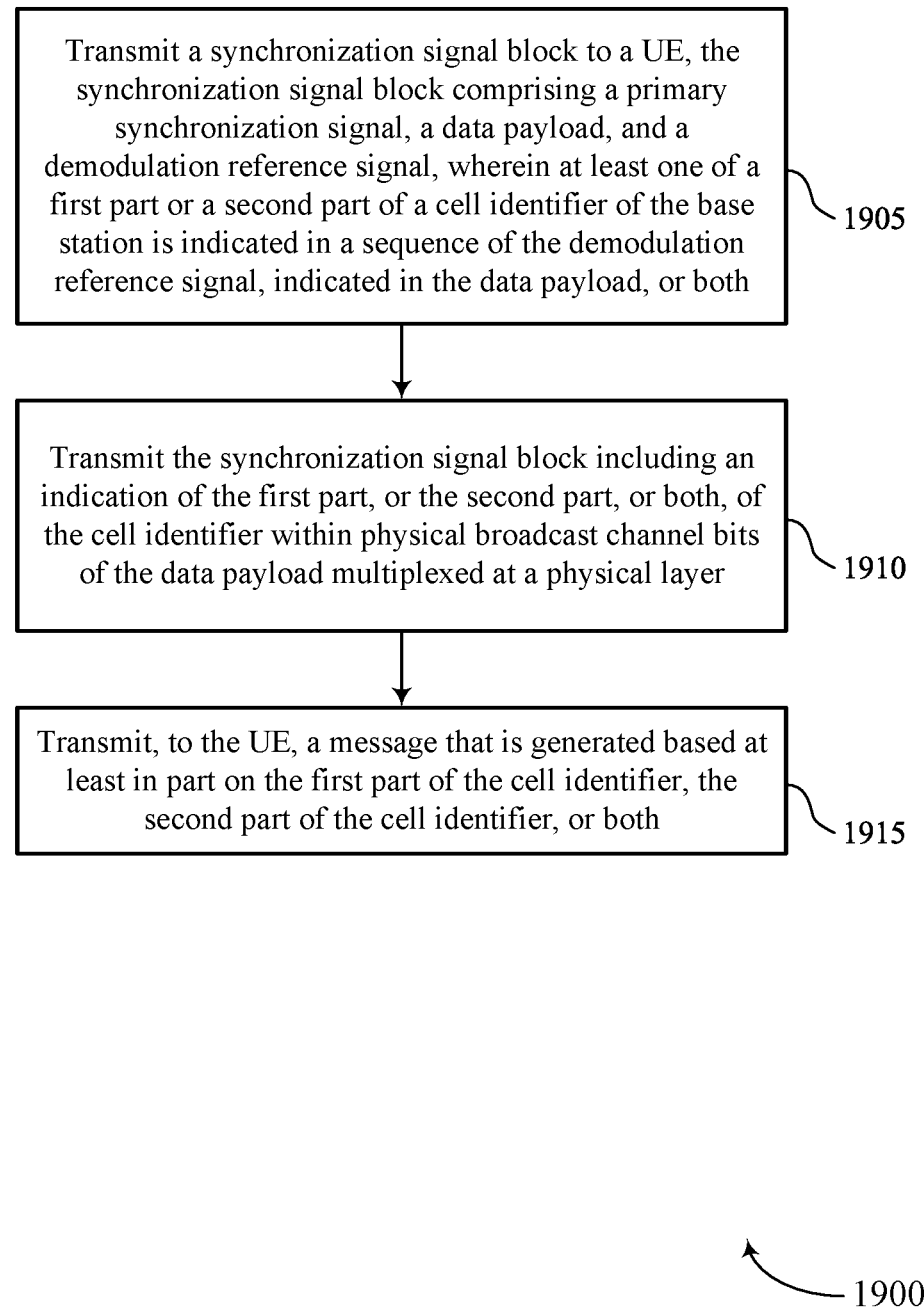

FIG. 19 shows a flowchart illustrating a method 1900 that supports scrambling initialization indication for higher bands in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting a SSB to a UE, the SSB including a PSS, a data payload, and a DMRS, where at least one of a first part or a second part of a cell ID of the base station is indicated in a sequence of the DMRS, indicated in the data payload, or both. The operations of 1905 may be performed in accordance with examples as disclosed herein. In some examples, aspects of the operations of 1905 may be performed by an SSB transmitter 1125 as described with reference to FIG. 11.

At 1910, the method may include transmitting the SSB including an indication of the first part, or the second part, or both, of the cell ID within PBCH bits of the data payload multiplexed at a physical layer. The operations of 1910 may be performed in accordance with examples as disclosed herein. In some examples, aspects of the operations of 1910 may be performed by an SSB transmitter 1125 as described with reference to FIG. 11.

At 1915, the method may include transmitting, to the UE, a message that is generated based on the first part of the cell ID, the second part of the cell ID, or both. The operations of 1915 may be performed in accordance with examples as disclosed herein. In some examples, aspects of the operations of 1915 may be performed by a message transmitter 1130 as described with reference to FIG. 11.

Figure 20:
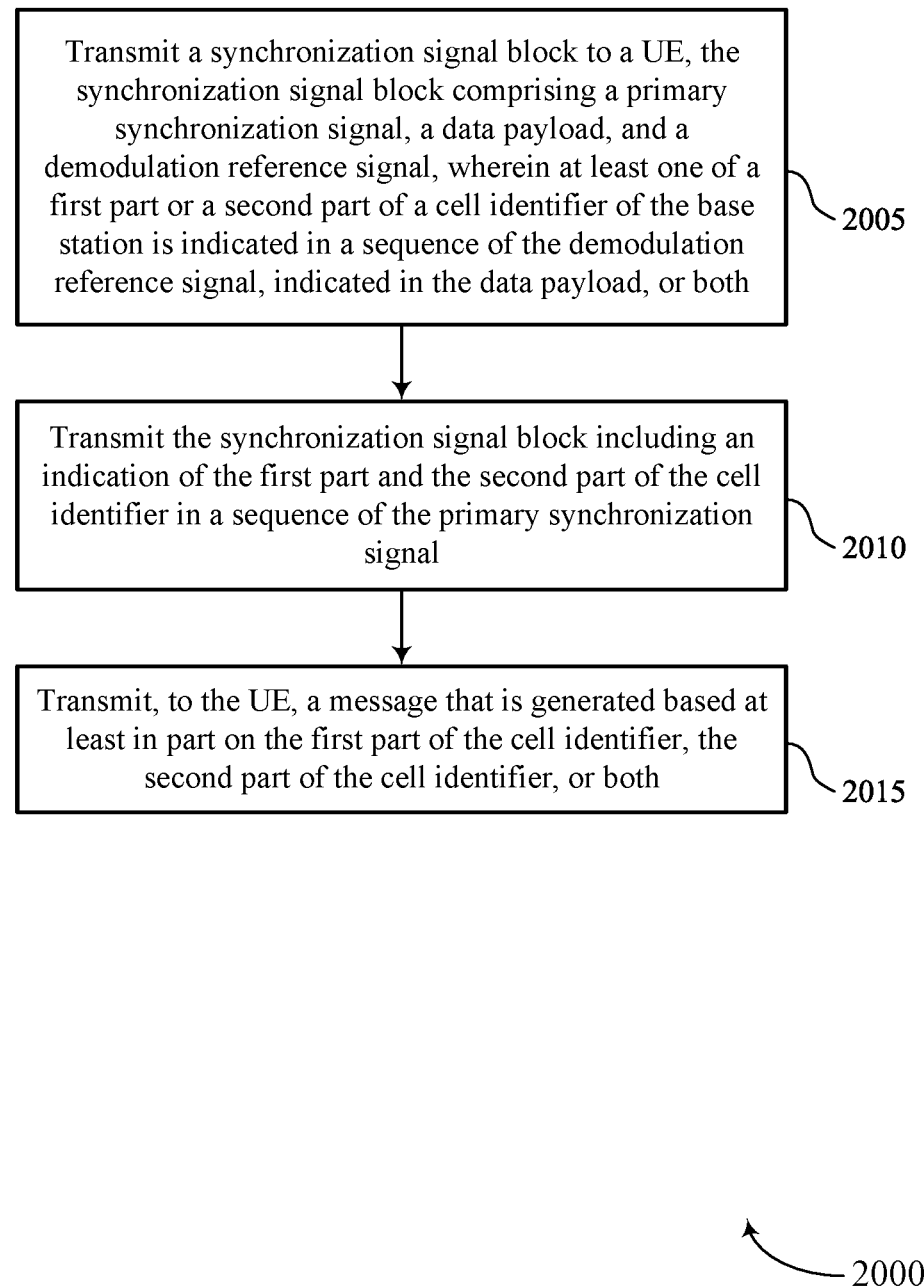

FIG. 20 shows a flowchart illustrating a method 2000 that supports scrambling initialization indication for higher bands in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include transmitting a SSB to a UE, the SSB including a PSS, a data payload, and a DMRS, where at least one of a first part or a second part of a cell ID of the base station is indicated in a sequence of the DMRS, indicated in the data payload, or both. The operations of 2005 may be performed in accordance with examples as disclosed herein. In some examples, aspects of the operations of 2005 may be performed by an SSB transmitter 1125 as described with reference to FIG. 11.

At 2010, the method may include transmitting the SSB including an indication of the first part and the second part of the cell ID in a sequence of the PSS. The operations of 2010 may be performed in accordance with examples as disclosed herein. In some examples, aspects of the operations of 2010 may be performed by an SSB transmitter 1125 as described with reference to FIG. 11.

At 2015, the method may include transmitting, to the UE, a message that is generated based on the first part of the cell ID, the second part of the cell ID, or both. The operations of 2015 may be performed in accordance with examples as disclosed herein. In some examples, aspects of the operations of 2015 may be performed by a message transmitter 1130 as described with reference to FIG. 11.

The following provides an overview of aspects of the present disclosure:

Aspect 1: A method for wireless communication at a UE, comprising: receiving a synchronization signal block from a base station, the synchronization signal block comprising a primary synchronization signal, a data payload, and a demodulation reference signal; identifying a first part and a second part of a cell identifier of the base station based at least in part on at least one of the first part or the second part of the cell identifier being indicated in a sequence of the demodulation reference signal, or indicated in the data payload, or both; and monitoring for a message from the base station based at least in part on the cell identifier.

Aspect 2: The method of aspect 1, wherein receiving the synchronization signal block further comprises: receiving the synchronization signal block comprising a master information block in the data payload, wherein the master information block comprises at least one of the first part of the cell identifier, the second part of the cell identifier, or both.

Aspect 3: The method of any of aspects 1 through 2, wherein receiving the synchronization signal block further comprises: receiving the synchronization signal block comprising one or more physical broadcast channel bits of the data payload multiplexed in a physical layer, wherein the physical broadcast channel bits indicate at least one of the first part of the cell identifier, the second part of the cell identifier, or both.

Aspect 4: The method of any of aspects 1 through 3, wherein receiving the synchronization signal block further comprises: receiving the synchronization signal block comprising the primary synchronization signal that is generated using a sequence indicating the first part of the cell identifier and the second part of the cell identifier.

Aspect 5: The method of any of aspects 1 through 4, wherein receiving the synchronization signal block further comprises: receiving the data payload via a physical broadcast channel of the synchronization signal block.

Aspect 6: The method of aspect 5, further comprising: demodulating the physical broadcast channel to obtain scrambled data based at least in part on the sequence of the demodulation reference signal; and descrambling the scrambled data to obtain at least a portion of the data payload based at least in part on a second sequence initialized by the first part of the cell identifier, the second part of the cell identifier, or both.

Aspect 7: The method of any of aspects 5 through 6, further comprising: demodulating the physical broadcast channel to obtain scrambled data based at least in part on the sequence of the demodulation reference signal; and descrambling the scrambled data to obtain at least a portion of the data payload based at least in part on a second sequence initialized by an index of the synchronization signal block.

Aspect 8: The method of any of aspects 1 through 7, further comprising: demodulating a physical broadcast channel of the synchronization signal block based at least in part on the sequence of the demodulation reference signal being initialized by the second part of the cell identifier.

Aspect 9: The method of any of aspects 1 through 8, further comprising: demodulating a physical broadcast channel of the synchronization signal block based at least in part on the sequence of the demodulation reference signal being initialized by an index of the synchronization signal block.

Aspect 10: The method of any of aspects 1 through 9, further comprising: receiving the message from the base station, wherein at least a portion of the message is generated based at least in part on the first part of the cell identifier, the second part of the cell identifier, or both.

Aspect 11: The method of aspect 10, further comprising: descrambling the portion of the message using the first part of the cell identifier, the second part of the cell identifier, or both.

Aspect 12: A method for wireless communication at a base station, comprising: transmitting a synchronization signal block to a UE, the synchronization signal block comprising a primary synchronization signal, a data payload, and a demodulation reference signal, wherein at least one of a first part or a second part of a cell identifier of the base station is indicated in a sequence of the demodulation reference signal, indicated in the data payload, or both; and transmitting, to the UE, a message that is generated based at least in part on the first part of the cell identifier, the second part of the cell identifier, or both.

Aspect 13: The method of aspect 12, wherein transmitting the synchronization signal block further comprises: transmitting the synchronization signal block including an indication of the first part of the cell identifier, or the second part of the cell identifier, or both, within a master information block of the data payload.

Aspect 14: The method of any of aspects 12 through 13, wherein transmitting the synchronization signal block further comprises: transmitting the synchronization signal block including an indication of the first part, or the second part, or both, of the cell identifier within physical broadcast channel bits of the data payload multiplexed at a physical layer.

Aspect 15: The method of any of aspects 12 through 14, wherein transmitting the synchronization signal block further comprises; transmitting the synchronization signal block including an indication of the first part and the second part of the cell identifier in a sequence of the primary synchronization signal Aspect 16: The method of any of aspects 12 through 15, wherein transmitting the synchronization signal block further comprises: transmitting the data payload via a physical broadcast channel.

Aspect 17: The method of aspect 16, further comprising: scrambling at least a portion of the data payload of the physical broadcast channel using a sequence initialized by the first part of the cell identifier, the second part of the cell identifier, or both.

Aspect 18: The method of any of aspects 16 through 17, further comprising: scrambling at least a portion of the data payload of the physical broadcast channel using a sequence initialized by an index of the synchronization signal block.

Aspect 19: The method of any of aspects 12 through 18, wherein transmitting the synchronization signal block further comprises: transmitting the demodulation reference signal that is generated based at least in part on the sequence of the demodulation reference signal being initialized by the second part of the cell identifier.

Aspect 20: The method of any of aspects 12 through 19, wherein transmitting the synchronization signal block further comprises: transmitting the demodulation reference signal that is generated based at least in part on the sequence of the demodulation reference signal being initialized by an index of the synchronization signal block.

Aspect 21: The method of any of aspects 12 through 20, wherein transmitting the message further comprises: scrambling at least a portion of the message based at least in part on the first part of the cell identifier, the second part of the cell identifier, or both.

Aspect 22: An apparatus for wireless communication at a UE, comprising a processor; memory coupled with the processor; and instructions stored in the memory and executable by the processor to cause the apparatus to perform a method of any of aspects 1 through 11.

Aspect 23: An apparatus for wireless communication at a UE, comprising at least one means for performing a method of any of aspects 1 through 11.

Aspect 24: A non-transitory computer-readable medium storing code for wireless communication at a UE, the code comprising instructions executable by a processor to perform a method of any of aspects 1 through 11.

Aspect 25: An apparatus for wireless communication at a base station, comprising a processor; memory coupled with the processor; and instructions stored in the memory and executable by the processor to cause the apparatus to perform a method of any of aspects 12 through 21.

Aspect 26: An apparatus for wireless communication at a base station, comprising at least one means for performing a method of any of aspects 12 through 21.

Aspect 27: A non-transitory computer-readable medium storing code for wireless communication at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a synchronization signal block from a base station, the synchronization signal block comprising a primary synchronization signal, a data payload, and a demodulation reference signal;
   identifying a first part and a second part of a cell identifier of the base station based at least in part on at least one of the first part or the second part of the cell identifier being indicated in a sequence of the demodulation reference signal, or indicated in the data payload, or both; and
   monitoring for a message from the base station based at least in part on the cell identifier.

2. The method of claim 1, wherein receiving the synchronization signal block further comprises:
   receiving the synchronization signal block comprising a master information block in the data payload, wherein the master information block comprises at least one of the first part of the cell identifier, the second part of the cell identifier, or both.

3. The method of claim 1, wherein receiving the synchronization signal block further comprises:
   receiving the synchronization signal block comprising one or more physical broadcast channel bits of the data payload multiplexed in a physical layer, wherein the physical broadcast channel bits indicate at least one of the first part of the cell identifier, the second part of the cell identifier, or both.

4. The method of claim 1, wherein receiving the synchronization signal block further comprises:
   receiving the synchronization signal block comprising the primary synchronization signal that is generated using a sequence indicating the first part of the cell identifier and the second part of the cell identifier.

5. The method of claim 1, wherein receiving the synchronization signal block further comprises:
   receiving the data payload via a physical broadcast channel of the synchronization signal block.

6. The method of claim 5, further comprising:
   demodulating the physical broadcast channel to obtain scrambled data based at least in part on the sequence of the demodulation reference signal; and
   descrambling the scrambled data to obtain at least a portion of the data payload based at least in part on a second sequence initialized by the first part of the cell identifier, the second part of the cell identifier, or both.

7. The method of claim 5, further comprising:
   demodulating the physical broadcast channel to obtain scrambled data based at least in part on the sequence of the demodulation reference signal; and
   descrambling the scrambled data to obtain at least a portion of the data payload based at least in part on a second sequence initialized by an index of the synchronization signal block.

8. The method of claim 1, further comprising:
   demodulating a physical broadcast channel of the synchronization signal block based at least in part on the sequence of the demodulation reference signal being initialized by the second part of the cell identifier.

9. The method of claim 1, further comprising:
   demodulating a physical broadcast channel of the synchronization signal block based at least in part on the sequence of the demodulation reference signal being initialized by an index of the synchronization signal block.

10. The method of claim 1, further comprising:
    receiving the message from the base station, wherein at least a portion of the message is generated based at least in part on the first part of the cell identifier, the second part of the cell identifier, or both.

11. The method of claim 10, further comprising:
    descrambling the portion of the message using the first part of the cell identifier, the second part of the cell identifier, or both.

12. A method for wireless communication at a base station, comprising:
transmitting a synchronization signal block to a user equipment (UE), the synchronization signal block comprising a primary synchronization signal, a data payload, and a demodulation reference signal, wherein at least one of a first part or a second part of a cell identifier of the base station is indicated in a sequence of the demodulation reference signal, indicated in the data payload, or both; and
transmitting, to the UE, a message that is generated based at least in part on the first part of the cell identifier, the second part of the cell identifier, or both.

13. The method of claim 12, wherein transmitting the synchronization signal block further comprises:
transmitting the synchronization signal block including an indication of the first part of the cell identifier, or the second part of the cell identifier, or both, within a master information block of the data payload.

14. The method of claim 12, wherein transmitting the synchronization signal block further comprises:
transmitting the synchronization signal block including an indication of the first part, or the second part, or both, of the cell identifier within physical broadcast channel bits of the data payload multiplexed at a physical layer.

15. The method of claim 12, wherein transmitting the synchronization signal block further comprises;
transmitting the synchronization signal block including an indication of the first part and the second part of the cell identifier in a sequence of the primary synchronization signal.

16. The method of claim 12, wherein transmitting the synchronization signal block further comprises:
transmitting the data payload via a physical broadcast channel.

17. The method of claim 16, further comprising:
scrambling at least a portion of the data payload of the physical broadcast channel using a sequence initialized by the first part of the cell identifier, the second part of the cell identifier, or both.

18. The method of claim 16, further comprising:
scrambling at least a portion of the data payload of the physical broadcast channel using a sequence initialized by an index of the synchronization signal block.

19. The method of claim 12, wherein transmitting the synchronization signal block further comprises:
transmitting the demodulation reference signal that is generated based at least in part on the sequence of the demodulation reference signal being initialized by the second part of the cell identifier.

20. The method of claim 12, wherein transmitting the synchronization signal block further comprises:
transmitting the demodulation reference signal that is generated based at least in part on the sequence of the demodulation reference signal being initialized by an index of the synchronization signal block.

21. The method of claim 12, wherein transmitting the message further comprises:
scrambling at least a portion of the message based at least in part on the first part of the cell identifier, the second part of the cell identifier, or both.

22. An apparatus for wireless communication at a user equipment (UE), comprising:
a processor;
memory coupled with the processor; and
instructions stored in the memory and executable by the processor to cause the apparatus to:
receive a synchronization signal block from a base station, the synchronization signal block comprising a primary synchronization signal, a data payload, and a demodulation reference signal;
identify a first part and a second part of a cell identifier of the base station based at least in part on at least one of the first part or the second part of the cell identifier being indicated in a sequence of the demodulation reference signal, or indicated in the data payload, or both; and
monitor for a message from the base station based at least in part on the cell identifier.

23. The apparatus of claim 22, wherein the instructions to receive the synchronization signal block are further executable by the processor to cause the apparatus to:
receive the synchronization signal block comprising a master information block in the data payload, wherein the master information block comprises at least one of the first part of the cell identifier, the second part of the cell identifier, or both.

24. The apparatus of claim 22, wherein the instructions to receive the synchronization signal block are further executable by the processor to cause the apparatus to:
receive the synchronization signal block comprising one or more physical broadcast channel bits of the data payload multiplexed in a physical layer, wherein the physical broadcast channel bits indicate at least one of the first part of the cell identifier, the second part of the cell identifier, or both.

25. The apparatus of claim 22, wherein the instructions to receive the synchronization signal block are further executable by the processor to cause the apparatus to:
receive the synchronization signal block comprising the primary synchronization signal that is generated using a sequence indicating the first part of the cell identifier and the second part of the cell identifier.

26. The apparatus of claim 22, wherein the instructions to receive the synchronization signal block are further executable by the processor to cause the apparatus to:
receive the data payload via a physical broadcast channel of the synchronization signal block.

27. An apparatus for wireless communication at a base station, comprising:
a processor;
memory coupled with the processor; and
instructions stored in the memory and executable by the processor to cause the apparatus to:
transmit a synchronization signal block to a user equipment (UE), the synchronization signal block comprising a primary synchronization signal, a data payload, and a demodulation reference signal, wherein at least one of a first part or a second part of a cell identifier of the base station is indicated in a sequence of the demodulation reference signal, indicated in the data payload, or both; and
transmit, to the UE, a message that is generated based at least in part on the first part of the cell identifier, the second part of the cell identifier, or both.

28. The apparatus of claim 27, wherein the instructions to transmit the synchronization signal block are further executable by the processor to cause the apparatus to:
transmit the synchronization signal block including an indication of the first part of the cell identifier, or the second part of the cell identifier, or both, within a master information block of the data payload.

29. The apparatus of claim 27, wherein the instructions to transmit the synchronization signal block are further executable by the processor to cause the apparatus to:

transmit the synchronization signal block including an indication of the first part, or the second part, or both, of the cell identifier within physical broadcast channel bits of the data payload multiplexed at a physical layer.

30. The apparatus of claim 27, wherein the instructions to are further executable by the processor to cause the apparatus to:

transmit the synchronization signal block including an indication of the first part and the second part of the cell identifier in a sequence of the primary synchronization signal.

\* \* \* \* \*